United States Patent
Sato et al.

(10) Patent No.: US 7,691,928 B2
(45) Date of Patent: Apr. 6, 2010

(54) RESIN COMPOSITION AND PROCESS FOR PRODUCING RESIN MOLDING

(75) Inventors: Noritaka Sato, Kanagawa (JP); Tsutomu Noguchi, Kanagawa (JP); Hiroyuki Mori, Kanagawa (JP)

(73) Assignee: Sony Corporation, Tokyo (JP)

( * ) Notice: Subject to any disclaimer, the term of this patent is extended or adjusted under 35 U.S.C. 154(b) by 1034 days.

(21) Appl. No.: 10/544,047

(22) PCT Filed: Jan. 29, 2004

(86) PCT No.: PCT/JP2004/000841

§ 371 (c)(1),
(2), (4) Date: Apr. 7, 2006

(87) PCT Pub. No.: WO2004/069932

PCT Pub. Date: Aug. 19, 2004

(65) Prior Publication Data

US 2006/0167134 A1    Jul. 27, 2006

(30) Foreign Application Priority Data

| Feb. 4, 2003 | (JP) | ............................ 2003-027590 |
| Mar. 25, 2003 | (JP) | ............................ 2003-083807 |
| Sep. 1, 2003 | (JP) | ............................ 2003-308385 |

(51) Int. Cl.
*C08K 5/23* (2006.01)
*C08K 3/34* (2006.01)

(52) U.S. Cl. ...................... 524/190; 524/191; 524/195; 524/451

(58) Field of Classification Search ............... 524/190, 524/192, 191, 195, 451; 523/148
See application file for complete search history.

(56) References Cited

U.S. PATENT DOCUMENTS

| 3,562,249 | A | * | 2/1971 | Schnabel et al. ............ 534/820 |
| 5,210,108 | A | | 5/1993 | Spinu et al. |
| 6,762,224 | B2 | * | 7/2004 | Feiler et al. .................... 524/87 |
| 6,790,884 | B2 | * | 9/2004 | Flandrin et al. ............... 524/89 |
| 2002/0178516 | A1 | | 12/2002 | Flandrin et al. |

FOREIGN PATENT DOCUMENTS

| EP | 1 253 476 | 10/2002 |
| JP | 04-220456 | 8/1992 |
| JP | 10-330625 | 12/1998 |
| JP | 2004-18658 | 1/2004 |

OTHER PUBLICATIONS

European Search Report dated Feb. 16, 2006.

* cited by examiner

*Primary Examiner*—Kriellion A Sanders
(74) *Attorney, Agent, or Firm*—Sonnenschein Nath & Rosenthal LLP

(57) ABSTRACT

The present invention provides a polyester resin component having crystallization improved and including a cyclic compound shown by a below-described formula and polyester capable of having a crystal structure.

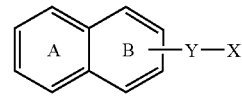

(In the formula, a ring A and a ring B respectively represent benzene rings, and hydrogen bonded to the benzene rings may optionally be substituted with other groups. Y represents —CONH— or —NHCO—. X represents a heterocyclic group or a condensed heterocyclic group including one or more NH or CO respectively).

18 Claims, 3 Drawing Sheets

RESIN COMPOSITION AND PROCESS FOR PRODUCING RESIN MOLDING

TECHNICAL FIELD

The present invention relates to a resin component including a polyester capable of having at least a crystal structure and a method for producing a purified product using the resin component.

This application claims a priority based on Japanese Patent Application No. 2003-27590 filed on Feb. 4, 2003, Japanese Patent Application No. 2003-83807 filed on Mar. 25, 2003, and Japanese Patent Application No. 2003-308385 filed on Sep. 1, 2003 in Japan. These applications are applied to this application by referring to them.

BACKGROUND ART

Biodegradable resins that are decomposed in a natural environment and molded bodies using the resins have been hitherto paid attention to.

Since the biodegradable resins can be produced from natural resources such as corns, there is no anxiety that the resources are exhausted, as compared with synthetic resins using fossil fuel such as petroleum or coal as a material. Further, since the biodegradable resins are decomposed in a natural world, a problem of a deficiency of waste treatment places can be solved. Especially, since the biodegradable resins have properties that the biodegradable resins use the natural resources as materials and are decomposed in the natural world, the biodegradable resins can advantageously suppress a quantity of generation of $CO_2$ gas that is considered to cause the global warming.

Aliphatic polyesters of the biodegradable resins, particularly, polylactic acid ordinarily has a high melting point as high as 170 to 180° C. The molded body made of the polylactic acid usually has a property of transparency and has already begun to be put to practical use depending on a use. The biodegradable resins are employed for materials for agriculture, forestry and fisheries such as films for covering soil, plant pots, fishing lines, fishing nets, materials for civil engineering works such as water holding sheets, plant nets, and a package and vessel field, particularly a filed of disposable products such as packages and vessels that are hardly recycled due to the adherence of soil or food or the like, daily miscellaneous goods, sanitary goods, play goods, etc. A more increase of the uses of the biodegradable resins has been studied from the viewpoint of an environmental protection. For instance, a study has been made that the biodegradable resins are applied to, for instance, television image receivers or acoustic devices, further, casing members of electronic devices such as personal computers or structures such as chassis.

The casing members of the electronic devices or the structures require a heat resistance to about 80° C. or so by taking a heat generation upon starting into consideration.

The molded body made of the polylactic acid is ordinarily poor in its heat resistance and has a glass transition temperature (Tg) of about 60° C. Accordingly, for instance, when temperature exceeds the glass transition temperature as shown in FIG. 1, the modulus of viscoelasticity of the molded body is undesirably deteriorated and deformed. Therefore, in order to employ the molded body for uses requiring the heat resistance, various examinations have been carried out. The heat resistance referred herein means a heat resistance having an adequately high modulus of viscoelasticity as high as 200 MPa at about 80° C.

To enhance the heat resistance of the biodegradable polyester including the polylactic acid, for instance, an addition of an inorganic filler has been examined. As the inorganic filler, talc or mica having the heat resistance has been examined. The addition of the inorganic filler is similar to a treatment that, so to say, reinforcing steels are inserted into concrete, and aims to improve mechanical characteristics and harden the resin by adding the hard inorganic filler having the heat resistance to the resin. However, only the addition of the inorganic filler is insufficient.

The polylactic acid exemplified as a typical example of the biodegradable resins is a polymer capable of having a crystal structure. Ordinarily, the polylactic acid is heated and molten at temperature exceeding the melting point of the polylactic acid and a metal mold of temperature not higher than the glass transition temperature (Tg) is filled with the obtained polylactic acid to harden the polylactic acid. Thus, the molded body having a desired form is obtained. In the molded body obtained in such a way, most of the polylactic acid remains amorphous and is liable to be thermally deformed. Thus, a study has been made that after the polylactic acid is molded, the biodegradable resin is thermally treated at temperature exceeding Tg to crystallize the polylactic acid and improve the heat endurance of the molded body. As a result of such a thermal treatment, the mechanical characteristics of the molded body made of the polylactic acid are more improved as shown by B in FIG. 1 than those of a molded body in which the thermal treatment is not carried out as shown by A in FIG. 1. However, since it takes long time for the thermal treatment, an efficient molding operation cannot be carried out. Further, when a thermal treatment temperature is raised, the crystallization of the polylactic acid can be saturated and completed in a short time. However, during the heat treatment, the molded body is undesirably deformed. Accordingly, to prevent the deformation of the molded body, the thermal treatment is carried out at temperature slightly exceeding Tg of the polylactic acid, for instance, at the temperature of about Tg+10° C., so that it takes much time for the thermal treatment to crystallize the polylactic acid. Thus, a method has been required that a large quantity of the molded body made of the biodegradable resin excellent in its heat resistance can be rapidly produced in industrial production processes.

Further, when the polylactic acid is crystallized by an ordinary method, the size of a crystal is in the order of micron to sub mm or so. The crystals themselves of the polylactic acid result in factors of a light scattering to become opaque and a transparency is lost. To solve the problems, that is, to accelerate the crystallization, an addition of, what is called, a nucleus agent is examined.

In order to accelerate the above-described crystallization of the biodegradable polyester, the inventors of the present invention study a resin component in which the crystallization of a polyester that may have a crystal structure such as the polylactic acid is accelerated. As the resin component of this type, the inventors of the present invention propose resin components as described respectively in the specifications of Japanese Patent Application Nos. 2002-038549, 2002-134253, 2002-263279, 2002-263283, and 2003-027590.

Here, the nucleus agent used for accelerating the crystallization of the biodegradable polyester serves as a primary crystal nucleus of a crystalline polymer to accelerate the growth of the crystal of the crystalline polymer. In a broad sense, the nucleus agent may serve to accelerate the crystallization of the crystalline polymer. That is, a material for accelerating the crystallization speed itself of the polymer may be also referred to as the nucleus agent. When the nucleus agent like the former is added to the resin, the crystals of the polymer become fine so that the rigidity or the resin is improved or the transparency is improved. Otherwise, when the biodegradable polyester is crystallized during molding the biodegradable polyester, since all the crystallization speed (time) is accelerated, a molding cycle can be advantageously shortened.

The above-described effects can be found in other crystalline resins as actual examples. For instance, when the nucleus agent is added to polypropylene (refer it also to as PP, hereinafter.), the rigidity or the transparency of polypropylene is improved. Today, the PP whose materiality is improved is put into practical use for many molded bodies. The nucleus agent includes, for instance, a sorbitol type material. Its mechanism of action is not completely clarified, however, a three-dimensional network formed by this material is considered to effectively act. Further, metallic salt type nucleus agents are also put into practical use for the PP. As such metallic salt type nucleus agents, for instance, hydroxy-di(t-butyl benzoate) aluminum, sodium bis (4-t-butylphenyl) phosphate, sodium methylene bis (2,4-di-t-butylphenyl) phosphate, etc. may be exemplified.

As the nucleus agent of the aliphatic polyester, a sorbitol type material as described in Japanese Patent Application Laid-Open No. hei 10-158369 has been examined. There is a description that the above-described material has actual results as a crystallizing nucleus agent for the PP and also effectively acts when this material is added to the polylactic acid. Further, as methods for accelerating the crystallization by adding the nucleus agent to the polyester, various methods have been studied. For instance, a technique as disclosed in Japanese Patent Application Laid-Open No. hei 9-278991 that at least one kind of a group of compounds including aliphatic carboxylic amide, aliphatic carboxylic salts, aliphatic alcohol and aliphatic carboxylic esters and having a melting point of 40 to 300° C. is added to an aliphatic polyester as a transparent nucleus agent, a technique as disclosed in Japanese Patent Application Laid-Open No. hei 11-5849 that at least one kind of organic compound selected from a group of organic compounds having a melting point or a softening point of 80 to 300° C. and a melting entropy of 10 to 100 cal/K/mol is added to an aliphatic polyester as a transparent nucleus agent, and a technique as disclosed in Japanese Patent Application Laid-Open No. hei 11-116783 that an aliphatic ester having a specific structure as a clarifying agent is added to a polylactic acid resin have been proposed.

DISCLOSURE OF THE INVENTION

It is an object of the present invention to provide a resin component that can solve the above-described problems of the related art and a method for producing a resin molded body using the resin component.

The inventors of the present invention eagerly studied to achieve the above-described object. As a result, they added a cyclic compound shown by a below-described formula to a polyester capable of having a crystal structure.

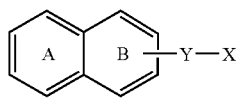

(In the formula, a ring A and a ring B respectively represent benzene rings, and hydrogen bonded to the benzene rings may optionally be substituted with other groups. Y represents —CONH— or —NHCO—. X represents a heterocyclic group or a condensed heterocyclic group including one or more NH or CO respectively.)

The inventors of the present invention found that the crystallization of the polyester could be improved by adding the cyclic compound to the polyester.

Further, the inventors determined that a cyclic compound shown by a below-described formula is preferable as the cyclic compound.

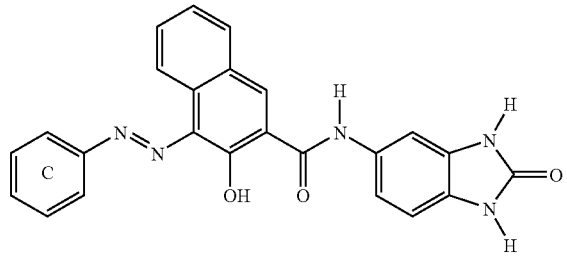

(In the formula, a ring C represents a benzene ring, and hydrogen bonded to the benzene ring may optionally be substituted with other group.)

The inventors determined that when the cyclic compound was mixed with the polyester capable of having a crystal structure, and then, heated and kneaded, a resin component that could be advantageously produced on an industrial scale industrially was made.

Further, the inventors of the present invention found that the crystallization of the polyester capable of having the crystal structure could be accelerated by using a nucleus agent including the cyclic compound.

The inventors of the present invention further made a study after they obtained various kinds of knowledge to complete the present invention.

Namely, the present invention concerns a resin component including a cyclic compound shown by a below-described formula and a polyester capable of having a crystal structure.

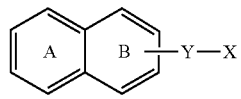

(In the formula, a ring A and a ring B respectively represent benzene rings, and hydrogen bonded to the benzene rings may optionally be substituted with other groups. Y represents —CONH— or —NHCO—. X represents a heterocyclic group or a condensed heterocyclic group including one or more NH or CO respectively.)

Further, in the resin component according to the present invention, the cyclic component includes a benzimidazolone structure.

Further, in the resin component according to the present invention, the cyclic compound shown by a below-described formula is included.

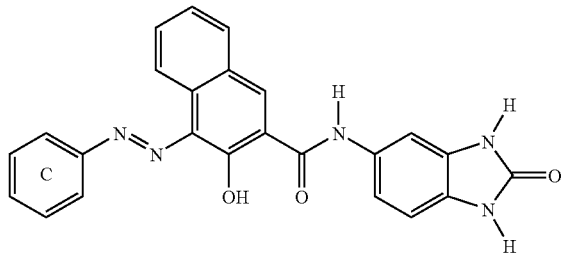

(In the formula, a ring C represents a benzene ring, and hydrogen bonded to the benzene ring may optionally be substituted with other group.)

In the resin component according to the present invention, as the cyclic compound, C. I. Pigment Violet 32, C. I. Pigment Red 185, or C. I. Pigment Red 208 is used.

In the resin component according to the present invention, as the polyester capable of having the crystal structure, a biodegradable polyester is employed. A polylactic acid is an example of a polyester capable of having the crystal structure.

In the resin component according to the present invention, the ratio of the cyclic compound is within a range from 0.001 to 10 parts by mass relative to the polyester of 100 parts by mass that is capable of having the crystal structure.

In the resin component according to the present invention, an inorganic filler is further added to the resin component. As the inorganic filler, talc is employed.

The ratio of the inorganic filler is desirably within a range from 1 to 50 parts by mass relative to the resin component of 100 parts by mass.

Further, a resin component according to the present invention includes a cyclic compound having a condensed azo structure and a polyester capable of having a crystal structure.

The cyclic compound having the condensed azo structure is specifically, for instance, a condensed azo compound expressed by a below-described formula. (Here, in the formula, A represents a bivalent connecting chain. B and C are monovalent substitutional groups respectively having aromatic rings. Further, the substitutional groups B and C may be the same substitutional groups or different substitutional groups.)

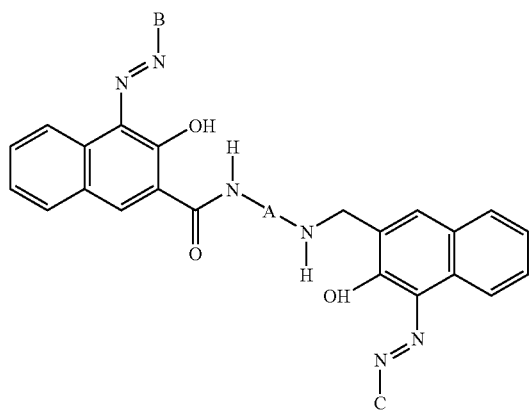

The cyclic compound having the condensed azo structure is added to the polyester as a nucleus agent. The condensed azo compound effectively acts on the polyester capable of having the crystal structure. The condensed azo compound is added to the polyester such as the biodegradable polyester so that the crystallization of the polyester is greatly accelerated. Accordingly, in the resin component of the present invention, the polyester is highly crystallized during molding or after molding. Thus, a rigidity, a moldability and a heat resistance are improved.

A method for producing a resin component according to the present invention comprises the steps of: mixing a cyclic compound having a condensed azo structure with a polyester capable of having a crystal structure and then, heating and kneading the mixture. A method for producing a resin molded body comprises the steps of: heating and melting a resin component including a cyclic compound having a condensed azo structure and a polyester capable of having a crystal structure at temperature within a temperature range from +10 to +50° C. of the melting point of the resin component; and filling a metal mold whose temperature is retained at temperature within a temperature range from −50 to +30° C. of the crystallization temperature of the resin component with the molten material of the resin component and holding the molten material to crystallize the resin component.

The cyclic compound having the condensed azo structure is combined and mixed with the polyester capable of having the crystal structure, so that the polyester is highly crystallized during a molding operation or after a molding operation. For instance, when the resin molded body is produced, the resin component including the cyclic compound having the condensed azo structure and the polyester capable of having the crystal structure is produced via a heating and melting process and a filling and holding process that are set at specific temperature. Thus, the polyester can be rapidly crystallized in the metal mold and the resin molded body excellent in its rigidity or heat resistance is formed.

Further, the present invention provides a method for producing a molded body by using the above-described resin component.

Further, a method for producing a molded body according to the present invention comprises the steps of: heating and melting the resin component including the polyester capable of at least having a crystal structure at temperature within a temperature range from +10 to +50° C. of the melting point of the resin component; and filling a metal mold whose temperature is retained at temperature within a temperature range from −50 to +30° C. of the crystallization temperature of the resin component with the molten material of the resin component and holding the molten material to crystallize the resin component.

In this case, the retained temperature of the metal mold is desirably within a range from 90 to 140° C.

Further, in the method for producing a molded body according to the present invention, the resin component is heated and molten under the coexistence of a crystallizing nucleus agent.

As the crystallizing nucleus agent used herein, (a) a cyclic compound having C=O and a functional group selected from NH, S and O in a molecule, (b) a mixture of a cyclic compound having C=O in a molecule and a cyclic compound having a functional group selected from NH, S and O in a molecule, (c) a phthalocyanine compound that may be substituted with other group or include metal, or (d) a porphyrin compound that may be substituted with other group is employed.

Further, as the crystallizing nucleus agent, one or more kinds of materials are employed that are selected from C. I. Vat Blue 1 (indigo), C. I. Pigment Red 254, C. I. Pigment Red 272, C. I. Pigment Orange 73, C. I. Pigment Yellow 110, C. I.

Pigment Yellow 109, C. I. Pigment Yellow 173, C. I. Pigment Violet 32, C. I. Pigment Red 185, and C. I. Pigment Red 205.

Still further, as the crystallizing nucleus agent, one or more kinds of materials are employed that are selected from C. I. Pigment Blue 15, C. I. Pigment Blue 15:1, C. I. Pigment Blue 15:2, C. I. Pigment Blue 15:3, C. I. Pigment Blue 15:4, and C. I. Pigment Blue 15:6.

Still another objects of the present invention and specific advantages obtained by the present invention will be more apparent from the description of embodiments explained by referring to the drawings.

BEST MODE FOR CARRYING OUT THE INVENTION

Figure 1:
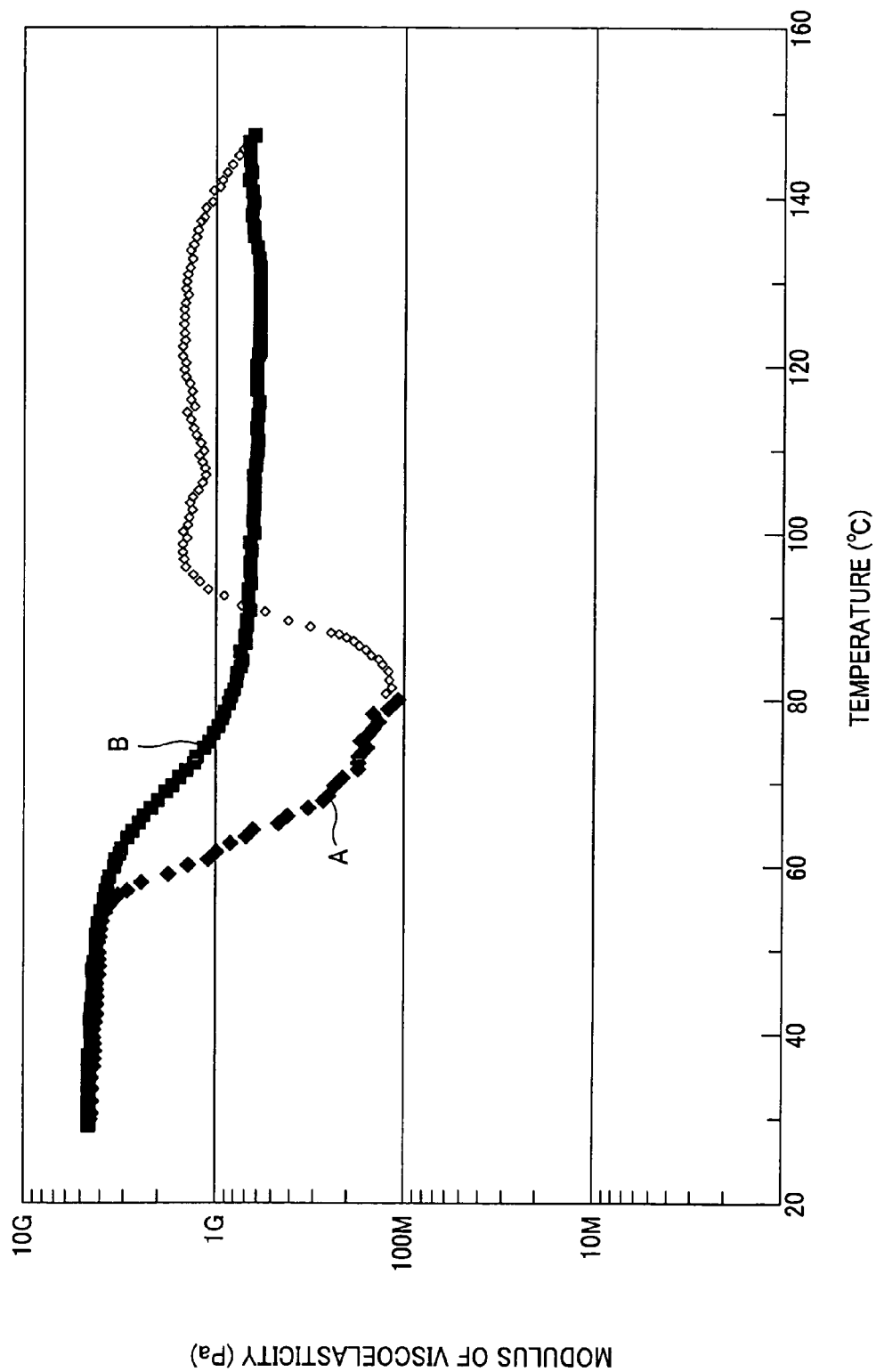
FIG. 1 is a diagram showing the relation between a modulus of viscoelasticity and temperature of a usual molded body of a polylactic acid resin (polylactic acid of 99.5 mass %+C. I. Pigment Red 254 of 0.5 mass %) that does not undergo a thermal treatment and a usual molded body of a polylactic acid resin that undergoes a thermal treatment for the purpose of crystallization.

Now, a resin component and a molded body using the resin component according to the present invention will be specifically described below.

The present invention provides a resin component to which a nucleus agent suitable for accelerating the crystallization of a polyester capable of having a crystal structure, particularly, a biodegradable polyester is added. Further, the present invention provides a method for producing a molded body using the resin component whose crystallization is improved. In a method for producing the molded body, the resin component including the polyester capable of at least having a crystal structure is heated and molten at temperature within a temperature range from +10 to +50° C. of the melting point of the resin component, and then, a metal mold whose temperature is retained at temperature within a temperature range from −50 to +30° C. of the crystallization temperature of the resin component with the molten material of the resin component and the molten material is held to crystallize the resin component.

Initially, the resin component used for producing the molded body of the resin component according to the present invention will be described below.

As the resin component used for the producing method of the present invention, any of resins including a polyester capable of at least having a crystal structure may be employed.

As the polyester capable of having the crystal structure, any of polymer compounds that have at least one ester bond and are capable of having the crystal structure may be employed and well-known polymer compounds may be employed. Herein, as the polyester capable of having the crystal structure, a polyester capable of partly having a crystal structure may be employed without a special limitation. A polyester in which all molecular chains cannot be necessarily regularly arranged may be employed. Any of polyesters in which all molecular chains do not have a regularity, however, a part of molecular chain segments can be oriented may be employed. Accordingly, the polyester capable of having the crystal structure is preferably formed in a straight chain shape, however, may be formed in a branch shape.

Further, in the present invention, the polyester capable of having the crystal structure is preferably a biodegradable polyester. As such a biodegradable polyester, for instance, polyester resins or the like that are metabolized by microorganisms may be exemplified. An aliphatic polyester having a moldability, a heat resistance and an impact resistance with good balance is preferably used among them.

As the aliphatic polyester, for instance, polyoxalic acid, polysuccinic acid, polyhydroxy butyric acid, polydiglycolic acid, polycaprolactone, polydioxanone, polylactic acid aliphatic polyester, etc., may be exemplified. The aliphatic polyester is preferably the polylactic acid aliphatic polyester. As the polylactic acid aliphatic polyester, for instance, polymers of hydroxy acids such as lactic acid, malic acid, glycolic acid or copolymers of them, etc. may be exemplified. The polylactic acid aliphatic polyester is preferably a hydroxycarboxylic acid aliphatic polyester among them. In the present invention, the above-described hydroxycarboxylic acid aliphatic polyester is preferably polylactic acid.

In the present invention, the biodegradable polyester can be produced in accordance with a well-known method. As the above-described producing method, any of methods by which the biodegradable polyester can be produced may be employed. For instance, methods such as a lactide method, a polycondensation of polyhydric alcohol and polybasic acid, or an intermolecular polycondensation of hydroxycarboxylic acid having a hydroxyl group and a carboxyl group in molecules may be exemplified. Especially, the polylactic acid aliphatic polyester may be ordinarily produced by a method in accordance with a ring-opening polymerization of lactide as a cyclic diester and corresponding lactones, what is called a lactide method. Further, the polylactic acid aliphatic polyester may be produced by a direct dehydration condensation method of lactic acid except the lactide method. As a catalyst for producing the polylactic acid aliphatic polyester, tin, antimony, zinc, titanium, iron, or aluminum compound may be exemplified. A tin type catalyst and an aluminum type catalyst are preferably employed among them. Tin octylate and aluminum acetyl acetonate are especially preferably employed.

Poly L-lactic acid obtained by the lactide ring-opening polymerization is preferable among the polylactic acid aliphatic polyesters, because the poly L-lactic acid is hydrolyzed to become L-lactic acid and its safety is recognized. The polylactic acid aliphatic polyester used in the present invention is not limited thereto and the lactide used for producing the polylactic acid aliphatic polyester is not limited to L forms. Further, in the present invention, as the biodegradable polyester, marketed goods, for instance, the name of a product of H100J (produced by Mitsui Chemicals, Inc.) may be employed.

The resin component used for the producing method according to the present invention may further include a polyester that does not necessarily have a crystal structure or other biodegradable resins or the like as resin component parts. As the biodegradable resins, polysaccharide derivatives such as cellulose, starch, dextran or chitin, peptides such as collagen, casein, fibrin or gelatin, polyamides such as polyamino acid, polyvinyl alcohol, nylon 4 or nylon 2/nylon 6 copolymer, polyesters known as materials that do not necessarily have a crystal structure, for instance, polyglycolic acid, polylactic acid, polysuccinic acid ester, polyoxalic acid ester, polyhydroxy butyric acid, polydiglycolic acid butylene, polycaprolactone, polydioxanone, etc. may be exemplified. There are many kinds of biodegradable resins and they can be used in the present invention. That is, biodegradable polymers are organic materials that are decomposed under the action of the natural world or organisms and assimilated therewith. Accordingly, the biodegradable polymers are ideal materials adapted to an environment. Thus, any of materials that do not harm the object of the present invention may be employed.

In the present invention, the biodegradable resins can be produced in accordance with a well-known method. Further, as the biodegradable resins, marketed goods may be used. As such marketed goods, for instance, a trade name of Lacty available from Toyota Motor Corporation, a trade name of Lacea available from Mitsui Chemicals, Inc. or a trade name of Nature Works available from Cargill Dow Polymer LLC may be exemplified.

The resin component may include only one kind of resin of the above-described biodegradable resins or two or more kinds of biodegradable resins. When the two or more kinds of biodegradable resins are included in the resin component, these resins may form a copolymer or may be mixed together.

Other resin than the above-described biodegradable resins may be included in the resin component. For instance, a synthetic resin or the like having no biodegrading property may be included in the resin component according to the present invention. As the synthetic resin, for instance, polylactic acid whose decomposition speed is moderated or polybutylene succinate, etc. may be exemplified.

The resin component used for the producing method according to the present invention preferably further includes a crystallizing nucleus agent in addition to the above-described resins. Any of the crystallizing nucleus agents that can accelerate the crystallization of the resin component may be employed. For instance, (a) a cyclic compound having C=O and a functional group selected from NH, S and O in a molecule, (b) a mixture of a cyclic compound having C=O in a molecule and a cyclic compound having a functional group selected from NH, S and O in a molecule, (c) a phthalocyanine compound that may be substituted with other group or include metal, or (d) a porphyrin compound that may be substituted with other group may be exemplified. More specifically, one or more kinds of materials may be exemplified that are selected from C. I. Vat Blue 1 (indigo), C. I. Pigment Red 254, C. I. Pigment Red 272, C. I. Pigment Orange 73, C. I. Pigment Yellow 110, C. I. Pigment Yellow, C. I. Pigment Yellow 173, C. I. Pigment Violet 32, C. I. Pigment Red 185, C. I. Pigment Red 205, C. I. Pigment Blue 15, C. I. Pigment Blue 15:1, C. I. Pigment Blue 15:2, C. I. Pigment Blue 15:3, C. I. Pigment Blue 15:4, and C. I. Pigment Blue 15:6. In the present invention, C. I. means a color index issued from The Society of Dyers and Colourists.

As the preferable cyclic compound having C=O and the functional group selected from NH, S and O in the molecule, for instance, a cyclic compound shown by a below-described formula is exemplified.

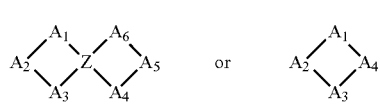 (I)

[In the formula, $A_1$ to $A_6$ represent any of X, Y and W as shown below. One molecule includes at least one X, Y and W, respectively. X represents —CO— and Y represents —NH—, —S— or —O—. Z represents a below-described formula.

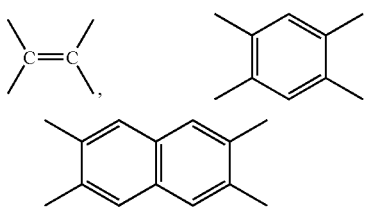 (II)

(In the formula, carbon atoms having no bond hand may be substituted with other groups as many as chemically permissible.) W represents a below-described formula.

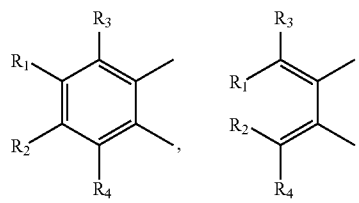 (III)

(In the formula, $R_1$, $R_2$, $R_3$ or $R_4$ means a hydrogen atom or a chemically permissible substitutional group. Otherwise, $R_1$ and $R_2$ may form a ring together.)]

More specifically, compounds shown by below-described formulae may be exemplified.

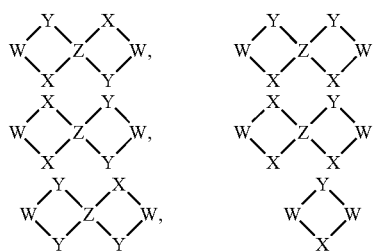

(In the above-described formulae, X, Y, Z and W have the same meanings as those described above.)

In the above-described compounds, the substitutional groups themselves are well-known substitutional groups. For instance, an alkyl group, an alkoxy group, halogen, an amino group, a carboxyl group, or a sulfo group, etc. may be exemplified. Further, these substitutional groups may be substituted with other substitutional groups as much as chemically permissible.

As the alkyl groups, for instance, methyl, ethyl, propyl, isopropyl, butyl, isobutyl, s-butyl, t-butyl, pentyl, isopentyl, neopentyl, hexyl, heptyl, octyl, nonyl, decyl, undecyl, dodecyl, tridecyl, tetradecyl, pentadecyl, etc. may be enumerated.

As the alkoxy groups, for instance, methoxy, ethoxy, propoxy, isopropoxy, butoxy, isobutoxy, sec-butoxy, tert-butoxy, pentyloxy, neopentyloxy, hexyloxy, etc. may be enumerated.

As halogens, for instance, fluorine, chlorine, bromine, iodine, etc. may be exemplified.

In the above-described compounds, as $R_1$ and $R_2$ that may form together a ring, cycloalkyl groups such as cyclopropyl, cyclobutyl, cyclopentyl, cyclohexyl, etc. and cycloalkenyl groups such as cyclopropenyl, 1-cyclopentenyl, 2-cyclopentenyl, 3-cyclopentenyl, 1-cyclohexenyl, 2-cyclohexenyl, 3-cyclohexenyl, 3-cycloheptenyl, etc. may be enumerated.

As the cyclic compound having C=O and the functional group selected from NH, S and O in a molecule, for instance, indigo, quinacridone, acridone or derivatives of them may be exemplified. These materials are ordinarily microcrystalline powder of several microns to several ten microns. The materials are desirably the microcrystalline powder of about micron or smaller if possible. Now, the materials will be respectively described below.

The indigo derivatives themselves may be well-known derivatives and include isomers or the like. As the indigo derivatives, for instance, a material in which the alkyl group, the alkoxy group, etc. is introduced to the indigo skeleton, a material in which the halogen such as chlorine is introduced to the indigo skeleton, thioindigo in which sulfur is introduced to the indigo skeleton and the derivatives thereof are exemplified. The structural formulae of the indigo and the thioindigo are shown below.

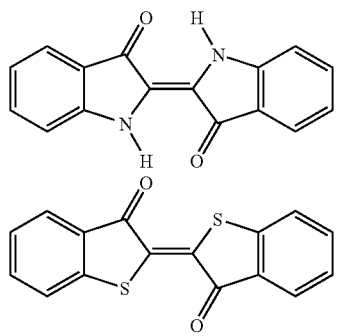

As the derivatives, specifically, materials obtained by substituting benzene rings located at both the ends of molecules with chemically permissible substitutional groups, for instance, the above-described alkyl group, the alkoxy group, halogen, the amino group, the carboxyl group may be exemplified. Further, as the isomers, a structural isomer such as indirubin shown below may be exemplified.

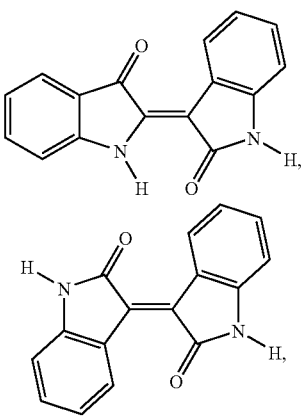

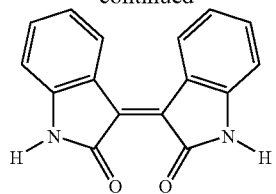

The material into which the halogen is introduced may be used among the indigo derivatives. However, in recent years, halogen-free resins have been developed. Accordingly, the indigo derivative into which the halogen is introduced is not preferably employed in this respect.

The quinacridone is a synthesized material. As a method for synthesizing the quinacridone, ten or more kinds of methods are known. In the present invention, the quinacridone produced by any of the synthesizing methods may be used.

The structural formula of the quinacridone is shown below.

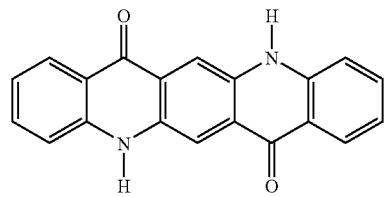

As the derivatives of the quinacridone, derivatives obtained by substituting benzene rings located at both ends in the above-described general formula with, for instance, the above-described alkyl group, the alkoxy group, the halogen, the amino group, the carboxyl group, etc. may be exemplified. As a specific example, quinacridone magenta as shown below may be exemplified.

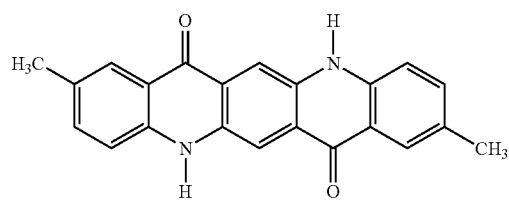

Further, a benzene ring located at a center may be substituted with a chemically permissible substitutional group. Further, a structural isomer as shown below may be included in the derivatives.

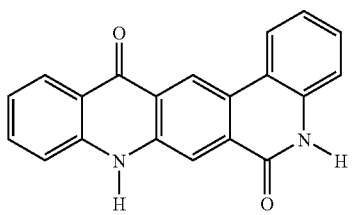

As the derivatives of the quinacridone, about 150 or more kinds of derivatives are known. Any of them may be used in the present invention. However, as described above, the derivatives including the halogen may be avoided from being used if possible.

Further, it has been known that the quinacridone forms a mixed crystal together with quinacridone quinone. Such a mixed crystal may be employed.

The structural formula of the acridone is shown below.

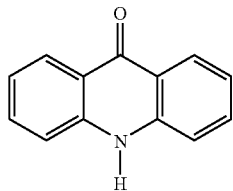

As for the derivatives of the acridone like the above-described two kinds of derivatives, derivatives obtained by substituting benzene rings located at both the ends of molecules with chemically permissible substitutional groups that are themselves known, for instance, the alkyl group, the alkoxy group, halogen, the amino group, the carboxyl group, etc. may be exemplified. A structural isomer may be employed.

Further, as the preferable cyclic compound having C=O and the functional group selected from NH, S and O in the molecule in the present invention, for instance, a cyclic compound shown by a below-described formula may be exemplified.

A1-B-A2 (In the formula, A1 and A2 represent the same or different groups shown by a below-described formula,

P represents a benzene ring that may be substituted with other substitutional group. B represents a bivalent hydrocarbon group that may be substituted with other substitutional group.)

As the benzene ring that may be substituted with other substitutional group, for instance, a benzene ring that is substituted with one to four equal or different substitutional groups or a benzene ring that is not substituted with other substitutional group, etc. may be exemplified. Here, the substitutional group represents the same meaning as described above.

As the bivalent hydrocarbon group that may be substituted with other substitutional group, for instance, a bivalent hydrocarbon group that is substituted with one or more equal or different substitutional groups or a bivalent hydrocarbon group that is not substituted with other substitutional group, etc. may be exemplified. Here, the substitutional group represents the same meaning as described above. As the bivalent hydrocarbon groups, for instance, below-described bivalent hydrocarbon groups may be exemplified. They include alkylene groups (for instance, methylene, methyl methylene, dimethyl methylene, ethylene, propylene, trimethylene, tetramethylene, pentamethylene, hexamethylene, heptamethylene, octamethylene, butylene group, 2-methyl propylene group, pentamethylene group, pentylene group, 2-methyl tetramethylene group, 2,2-dimethyl trimethylene group, 2-ethyl trimethylene group, hexamethylene group, hexylene group, 2-methyl pentamethylene group, 3-methyl pentamethylene group, heptamethylene group, heptylene group, octamethylene group, octylene group, 2-ethyl hexylene group, nonamethylene group, nonylene group, decamethylene group, decylene group, cyclopropylene, 1,2-cyclobutylene, 1,3-cyclobutylene, cyclopentylene, 1,3-cyclopentylene, cyclohexylene, 1,3-cyclohexylene, 1,4-cyclohexylene, etc.), alkenylene groups (for instance, vinylene, propenylene, 1-propene-1,2-ylene, 2-propene-1,2-ylene, butenylene (for instance, 1-butene-1,4-ylene, 2-butene-1,4-ylene, etc.), pentenylene (for instance, 1-pentene-1,5-ylene, 2-pentene-1,5-ylene, etc.), hexenylene (for instance, 1-hexene-1,6-ylene, 2-hexene-1,6-ylene, 3-hexene-1,6-ylene, etc.), cyclopropenylene (for instance, 1-cyclopropene-1,2-ylene, 2-cyclopropene-1,2-ylene, etc.), cyclobutenylene (for instance, 1-cyclobutene-1,2-ylene, 1-cyclobutene-1,3-ylene, 2-cyclobutene-1,2-ylene, 3-cyclobutene-1,2-ylene, etc.), cyclopentenylene (for instance, 1-cyclopentene-1,2-ylene, 1-cyclopentene-1,3-ylene, 2-cyclopentene-1,2-ylene, 3-cyclopenten-1,2-ylene, 3-cyclopenten-1,3-ylene, 4-cyclopenten-1,3-ylene, etc.), or cyclohexenylene (for instance, 1-cyclohexene-1,2-ylene, 1-cyclohexene-1,3-ylene, 1-cyclohexene-1,4-ylene, 2-cyclohexene-1,2-ylene, 2-cyclohexene-1,4-ylene, 3-cyclohexene-1,2-ylene, 3-cyclohexene-1,3-ylene, 4-cyclohexene-1,2-ylene, 4-cyclohexene-1,3-ylene, etc.), alkynylene groups (for instance, ethynylene, propynylene, 1 butynylene, 2-butynylene, 1-pentynylene, 2-pentynylene, 3-pentynylene, etc.), cycloalkylene groups (for instance, 1,4-cyclohexylene, etc.), phenylene groups (for instance, o-phenylene, m-phenylene, p-phenylene, etc.), naphthylene groups, or bivalent hydrocarbon groups obtained by substituting these hydrocarbon groups by other substitutional groups as much as chemically permissible.

As the above-described cyclic compounds shown by the above-described formula A1-B-A2, below-described compounds may be exemplified. They include, for instance, a compound shown by a below-described formula,

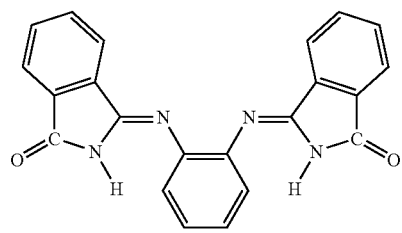

a compound shown by a below-described formula,

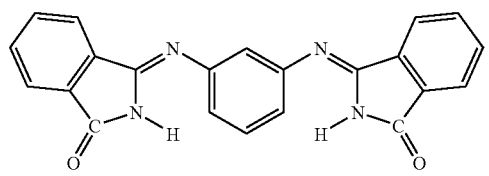

a compound shown by a below-described formula,

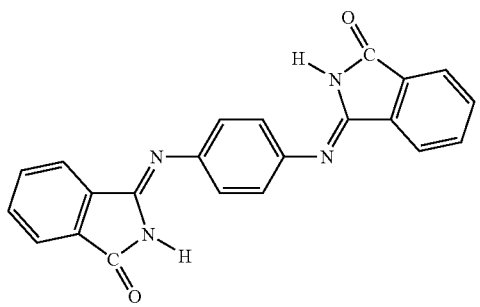

a compound shown by a below-described formula,

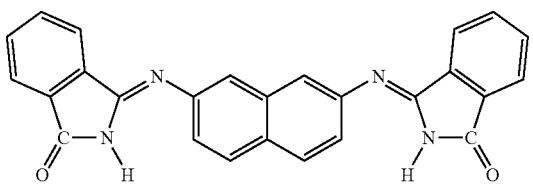

a compound shown by a below-described formula,

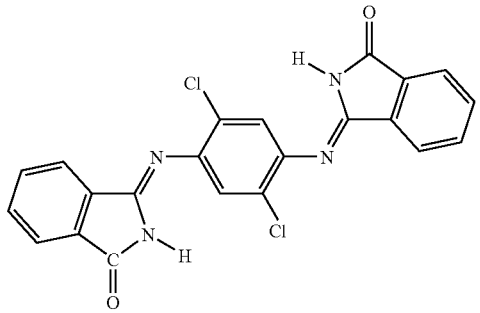

a compound shown by a below-described formula,

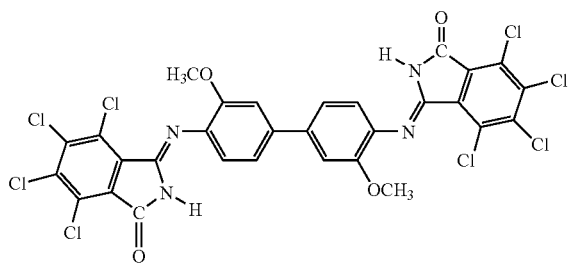

a compound shown by a below-described formula,

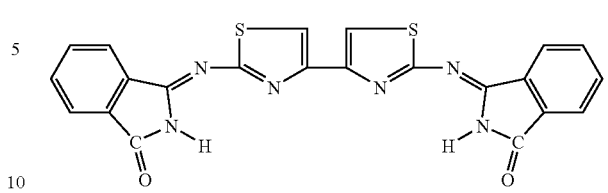

a compound shown by a below-described formula,

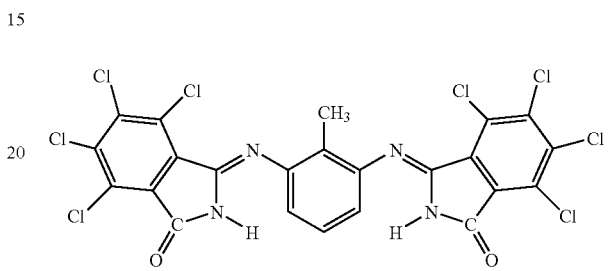

a compound shown by a below-described formula,

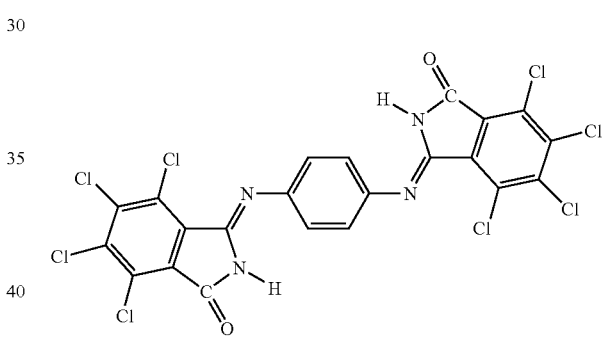

a compound shown by a below-described formula,

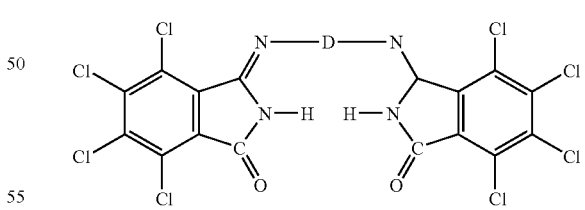

(In the formula, D represents a below-described formula,

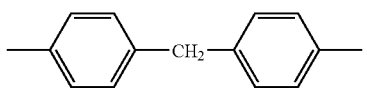

a below-described formula,

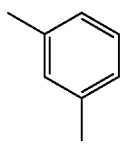

a below-described formula,

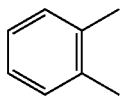

a below-described formula,

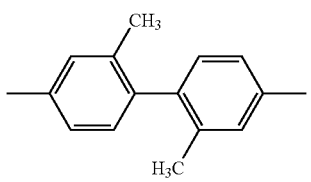

a below-described formula,

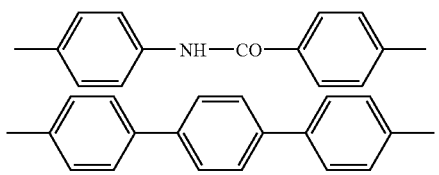

a below-described formula,

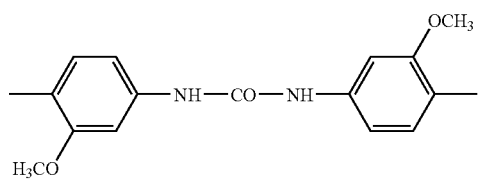

or a below-described formula,

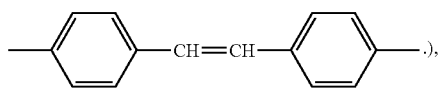

or compounds obtained by substituting these compounds by other substitutional groups as much as chemically permissible. Further, the above-described bivalent hydrocarbon groups represented by D may exemplify the bivalent hydrocarbon groups represented by B.

In the present invention, the cyclic compound shown by the above-described formula A1-B-A2 is preferably 3,3'-(2-methyl-1,3-phenylene)diimino-bis-4,5,6,7-tetrachloro-1H-isoindole-1-one expressed by a below-described formula,

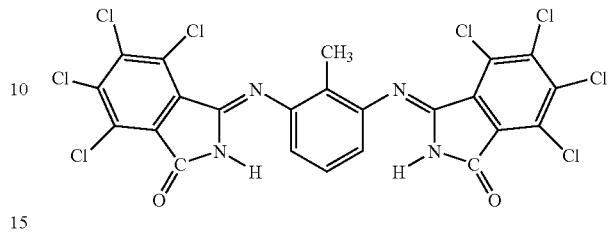

or 3,3'-(1,4-phenylene diimino)bis-4,5,6,7-tetrachloro-1H-isoindole-1-one expressed by a below-described formula.

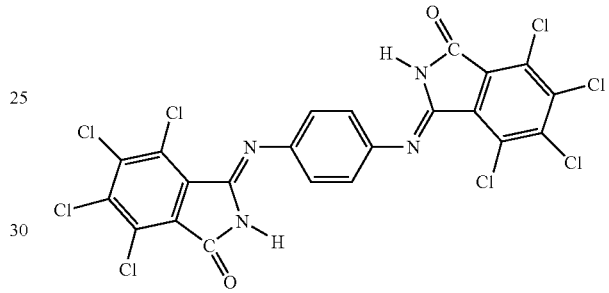

Further, according to the present invention, as the above-described cyclic compounds, isomers of the above-described cyclic compounds, for instance, tautomers of the above-described cyclic compounds may be employed.

Accordingly, a group shown by a below-described formula (in the formula, P has the same meaning as described above)

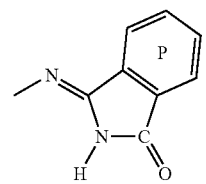

includes a group as a tautomer thereof shown by a below-described formula (in the formula, P has the same meaning as described above).

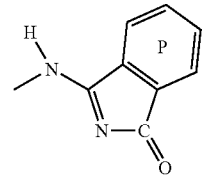

Further, in the compound represented by the above-described formula A1-B-A2, one of A1 and A2 may represent a group shown by a below-described formula

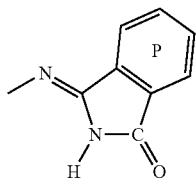

(in the formula, P has the same meaning as described above) and the other may represent a below-described formula

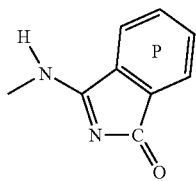

(in the formula, P has the same meaning as described above).

Further, in the present invention, as the preferable cyclic compound having C=O and the functional group selected from NH, S and O in the molecule, for instance, a cyclic compound shown by a below-described formula may be exemplified.

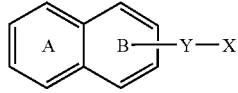

(In the formula, a ring A and a ring B respectively represent benzene rings, and hydrogen bonded to the benzene rings may optionally be substituted with other groups. Y represents —CONH— or —NHCO—. X represents a heterocyclic group or a condensed heterocyclic group including one or more NH or CO respectively.)

The above-described ring A and the ring B and a below-described ring C may be benzene rings that are not substituted with other substitutional groups or benzene rings that have substitutional groups.

Here, the substitutional groups specifically include groups described below. For instance, they include halogen atoms (for instance, fluorine, chlorine, bromine, iodine, etc.), a nitro group, a cyano group, a hydroxy group, a thiol group, a sulfo group, a sulfino group, a mercapto group, a phosphono group, a strain chain type or branching type alkyl group (for instance, a methyl group, an ethyl group, an isopropyl group, an n-propyl group, an n-butyl group, an isobutyl group, a secondary butyl group, a tertiary butyl group, a pentyl group, a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl, an eicosyl group, etc.), a hydroxy alkyl group (for instance, a hydroxy methyl group, a hydroxy ethyl group, 1-hydroxy isopropyl group, 1-hydroxy-n-propyl group, 2-hydroxy-n-butyl group, 1-hydroxy-isobutyl group, etc.), a halogenoalkyl group (for instance, chloromethyl, dichloromethyl, trichloromethyl, fluoromethyl, difluoromethyl, trifluoromethyl, 2-bromoethyl, 2,2,2-trifluoroethyl, pentafluoroethyl, 3,3,3-trifluoropropyl, 4,4,4-trifluorobutyl, 5,5,5-trifluoropentyl, 6,6,6-trifluorohexyl, etc.), a cycloalkyl group (for instance, cyclopropyl, cyclobutyl, cyclopentyl, cyclohexyl, cycloheptyl, etc.), an alkenyl group (for instance, vinyl, crotyl, 2-pentenyl, 3-hexenyl, etc.), a cycloalkenyl group (for instance, 2-cyclopentenyl, 2-cyclohexenyl, 2-cyclopentenyl methyl, 2-cyclohexenyl methyl, etc.), an alkynyl group (for instance, ethynyl, 1-propynyl, 2-propynyl, 1-butynyl, 2-pentynyl, 3-hexynyl, etc.), an oxo group, a thioxo group, an amidino group, an imino group, an alkylenedioxy group (for instance, methylenedioxy, ethylenedioxy, etc.), an aromatic hydrocarbon group, for instance, a monocyclic aromatic or polycyclic aromatic hydrocarbon group such as phenyl, biphenyl, etc., a cross-linked cyclic hydrocarbon group such as 1-adamantyl group, 2-norbornanyl, etc., an alkoxy group (for instance, methoxy, ethoxy, propoxy, isopropoxy, butoxy, isobutoxy, sec-butoxy, tert-butoxy, pentyloxy, neopentyloxy, hexyloxy, etc.), an alkylthio group (for instance, methylthio, ethylthio, propylthio, isopropylthio, butylthio, isobutylthio, pentylthio, hexylthio, etc.), a carboxyl group, an alkanoyl group (for instance, formyl; acetyl, propionyl, butyryl, isobutyryl, etc.), an alkanoyloxy group (for instance, formyloxy; alkyl-carbonyloxy groups such as acetyloxy, propionyloxy, butyryloxy, isobutyryloxy, etc.), an alkoxy carbonyl group (for instance, methoxy carbonyl, ethoxy carbonyl, propoxy carbonyl, butoxy carbonyl, etc.), an aralkyloxy carbonyl group (for instance, benzyloxy carbonyl, etc.), a thiocarbamoyl group, an alkyl sulfinyl group (for instance, methyl sulfinyl, ethyl sulfinyl, etc.), an alkyl sulfonyl group (for instance, methyl sulfonyl, ethyl sulfonyl, butyl sulfonyl, etc.), a sulfamoyl group, a mono-alkyl sulfamoyl group (for instance, methyl sulfamoyl, ethyl sulfamoyl, etc.), a di-alkyl sulfamoyl group (for instance, dimethyl sulfamoyl, diethyl sulfamoyl, etc.), an aryl sulfamoyl group (for instance, phenyl sulfamoyl, naphthyl sulfamoyl, etc.), an aryl group (for instance, phenyl, naphthyl, etc.), an aryloxy group (for instance, phenyloxy, naphthyloxy, etc.), an arylthio group (for instance, phenylthio, naphthylthio, etc.), an aryl sulfinyl group (for instance, phenyl sulfinyl, naphthyl sulfinyl, etc.), an aryl sulfonyl group (for instance, phenyl sulfonyl, naphthyl sulfonyl, etc.), an aryl carbonyl group (for instance, benzoyl, naphthoyl, etc.), an aryl carbonyloxy group (for instance, benzoyloxy, naphthoyloxy, etc.), an alkyl carbonyl amino group that may be halogenated (for instance, acetyl amino, trifluoro acetyl amino, etc.), a carbamoyl group that may have a substitutional group (for instance, a group represented by a formula —$CONR_3R_4$ (in the formula, $R_3$ and $R_4$ respectively show a hydrogen atom, hydrocarbon groups that may have a substitutional group or heterocyclic groups that may have a substitutional group. Otherwise, $R_3$ and $R_4$ may form rings together with an adjacent nitrogen atom)), an amino group that may have a substitutional group (for instance, amino, alkyl amino, tetrahydro pyrrole, piperazine, piperidine, morpholine, thiomorpholine, pyrrole, imidazole, etc.), an ureide group that may have a substitutional group (for instance, a group represented by a formula —$NHCONR_3R_4$ (in the formula, $R_3$ and $R_4$ show the same meanings as those described above), etc.), a carboxamide group that may have a substitutional group (for instance, a group represented by a formula —$NR_3COR_4$ (in the formula, $R_3$ and $R_4$ show the same meanings as those described above), etc.), a sulfonamide group that may have a substitutional group (for instance, a group represented by a formula —$NR_3SO_2R_4$ (in the formula, $R_3$ and $R_4$ show the same meanings as those described above), etc.), a hydroxyl group or a mercapto group that may have a substitutional group, a heterocyclic group that may have a substitutional group (for instance, an aromatic heterocyclic group (for instance, pyridyl, furyl, thiazolyl, etc.) that includes at least one of one to three kinds of hetero atoms selected from oxygen atoms, sulfur atoms, and nitrogen atoms except carbon atoms as, for instance, atoms (cyclic atoms) forming a cyclic system, or a saturated or unsaturated aliphatic heterocyclic group, etc.), or substitutional groups with which these substitutional groups are substituted as much as chemically permissible.

The substitutional groups used herein have the same meanings as those described above. The number of the substitutional groups is suitably selected from 1 to 5 respectively for the ring A, the ring B, and the ring C.

As the heterocyclic group having one or more NH and CO respectively, a five-membered to six-membered heterocyclic group is preferably employed. Specifically, an imidazolone group may be exemplified. As the condensed heterocyclic group, for instance, a group formed by removing hydrogen atoms of the benzene ring of benzimidazolone represented by a below-described formula may be exemplified. This benzene ring may be substituted with the above-described substitutional groups of the benzene ring.

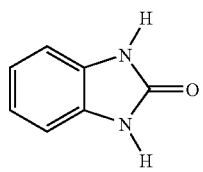

As the above-described cyclic compound, for instance, a compound expressed by a below-described formula or the like may be exemplified.

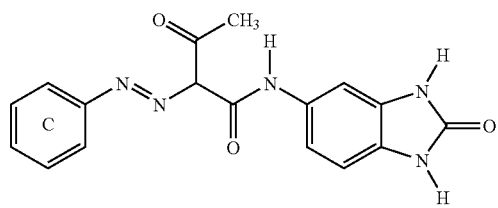

(In the formula, a C ring represents a benzene ring that may be substituted with substitutional groups.)

More specifically, a compound expressed by a below-described formula is exemplified as the cyclic compound.

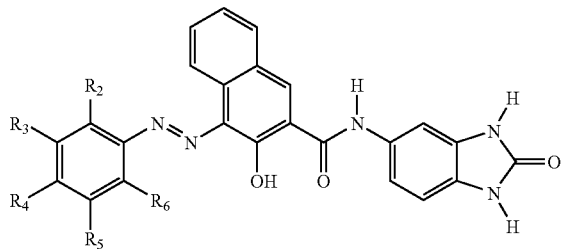

(In the formula, $R_2$, $R_3$, $R_4$, $R_5$ and $R_6$ are respectively the same or different and represent hydrogen atoms, or for instance, the above-described monovalent substitutional groups.)

In the cyclic compound expressed by the above-described formula, C. I. Pigment Red 171 in which $R_2$ is an $OCH_3$ group, $R_3$, $R_5$ and $R_6$ are H groups and $R_4$ is an $NO_2$ group, C. I. Pigment Red 175 in which $R_2$ is a $COOCH_3$ group and $R_3$, $R_4$, $R_5$ and $R_6$ are H groups, C. I. Pigment Red 176 in which $R_2$ is an $OCH_3$ group, $R_3$, $R_5$ and $R_6$ are H groups and $R_4$ is a $CONHC_6H_5$ group, C. I. Pigment Red 185 in which $R_2$ is an $OCH_3$ group, $R_3$ and $R_6$ are H groups, $R_4$ is an $SO_2NHCH_3$ group and $R_5$ is a $CH_3$ group, C. I. Pigment Red 208 in which $R_2$ is a $COOC_4H_9$ group (here, a $C_4H_9$ group is a straight chain type) and $R_3$, $R_4$, $R_5$ and $R_6$ are hydrogen groups, C. I. Pigment Violet 32 in which $R_2$ is an $OCH_3$ group, $R_3$ and $R_6$ are hydrogen groups, $R_4$ is an $SO_2NHCH_3$ group and $R_5$ is an $OCH_3$ group, C. I. Pigment Brown 25 in which $R_2$ and $R_5$ are Cl groups and $R_3$, $R_4$ and $R_6$ are hydrogen groups, etc. may be enumerated. In the above description, C. I. means a color index issued by The Society of Dyers and Colourists.

In the present invention, as a preferable mixture of the cyclic compound having C=O in the molecule and the cyclic compound having the functional group selected from NH, S and O in the molecule, for instance, a mixture expressed by a below-described formula may be exemplified.

a mixture of

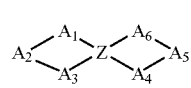 (a)

and

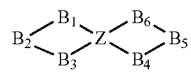 (b)

or a mixture of

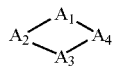 (c)

and

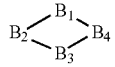 (d)

(IV)

(In the formula, $A_1$ to $A_6$ represent either X or W and at least one of $A_1$ to $A_6$ is X in one molecule. $B_1$ to $B_6$ represent either Y or W. At least one of $B_1$ to $B_6$ is Y in one molecule. Further, X, Y, Z and W have the same meanings as those described above.)

More specifically, mixtures shown by below-described formulae may be exemplified.

a mixture of

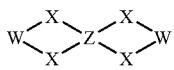

and

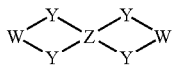

or a mixture of

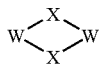

and

(In the formulae, X, Y, Z and W have the same meanings as those described above.)

Further, in the present invention, as a preferable mixture of the cyclic compound having C=O and the functional group selected from NH, S and O in the molecule, or the cyclic compound having C=O in the molecule and the cyclic compound having the functional group selected from NH, S and O in the molecule, for instance, a mixture of a cyclic compound expressed by a general formula (I)

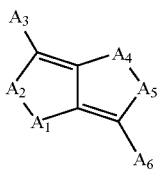

(I)

[In the formula, $A_1$, $A_2$, $A_4$ and $A_5$ are the same or different and represent —CO— or —NH—. $A_3$ and $A_6$ are the same or different and represent hydrogen, halogen, aliphatic groups that may be substituted with other substitutional groups or aromatic groups that may be substituted with other substitutional groups.] and having —CO— and —NH— in a molecule or (a) a cyclic compound having —CO— in a molecule and having no —NH— in the molecule and (b) a cyclic compound having no ~O— in a molecule and having —NH— in the molecule may be exemplified.

As the halogen represented by $A_3$ and $A_6$ in the general formula (I), fluorine, chlorine, bromine or iodine may be exemplified. As the aliphatic groups, for instance, straight chain or branching type alkyl groups having the number of carbons of 1 to 12 such as methyl, ethyl, propyl, butyl, hexyl, octyl or decyl, or cyclic alkyl groups having the number of carbons of 3 to 8 such as cyclopropyl, cyclobutyl, cyclopentyl or cyclohexyl may be exemplified. As the aromatic groups, homocyclic aromatic groups having the number of carbons of 6 to 12 such as phenyl, naphthyl, etc., or five-membered to six-membered heterocyclic groups having 1 to 3 of N, S and O such as furyl, thienyl, pyridyl, thiazolyl may be exemplified. These aliphatic groups or the aromatic groups may be substituted with other substitutional groups. The substitutional groups have the same meanings as described above.

As the cyclic compound expressed by the above-described general formula (I) and having —CO— and —NH— in the molecule, for instance, compounds represented by below-described formulae are exemplified.

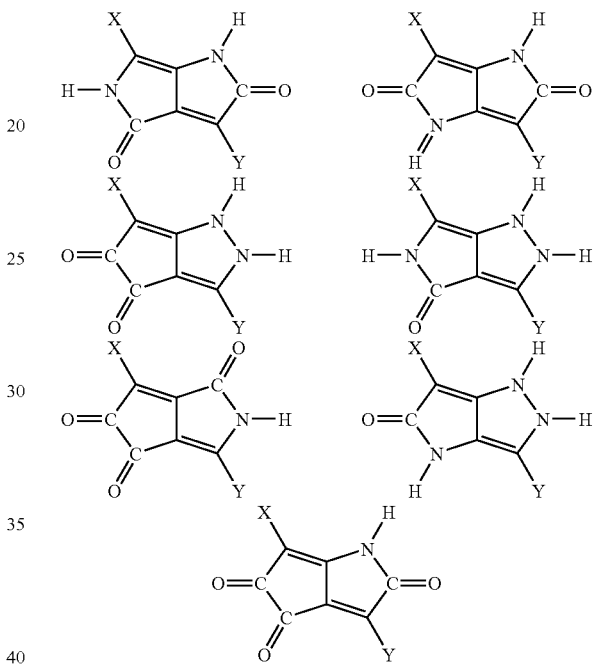

(In the formulae, X has the same meanings as those of $A_3$ in the above-described general formula (I). Y has the same meanings as those of $A_6$ in the above-described general formula (I).)

More specifically, compounds represented by below-described formulae are exemplified.

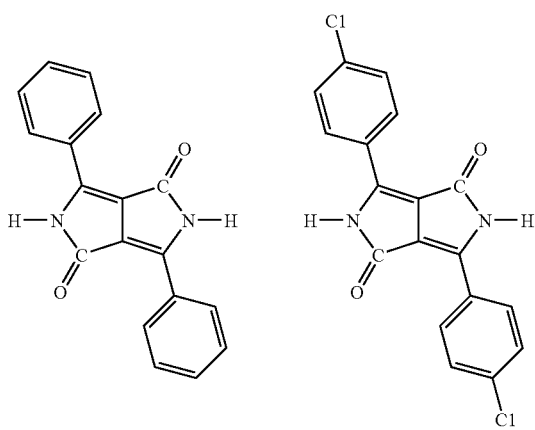

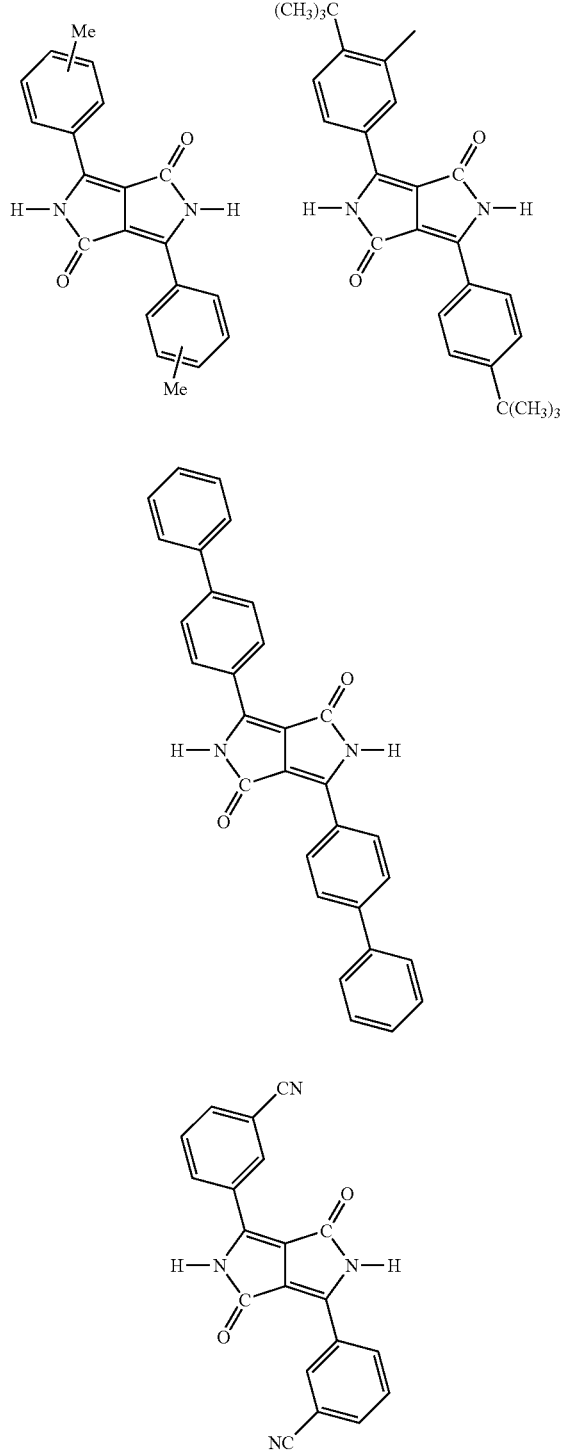

As the mixture of (a) the cyclic compound having —CO— in the molecule and having no —NH— in the molecule and (b) the cyclic compound having no —CO— in the molecule and having —NH— in the molecule, a mixture of two compounds expressed by two formulae described below is exemplified.

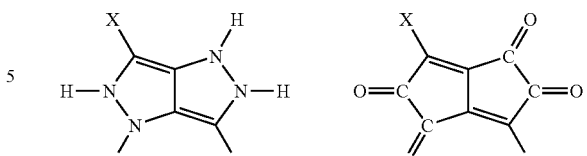

(In the formulae, X has the same meanings as those of $A_3$ in the above-described general formula (I). Y has the same meanings as those of $A_6$ in the above-described general formula (I).) More specifically, as the mixtures, 1,4-diketo-2,5-dihydro-3,6-diphenyl-pyrrolo[3,4-c]pyrrole (C. I. Pigment Red 255), 1,4-diketo-2,5-dihydro-3,6-dip-chlorophenyl) pyrrolo[3,4-c]pyrrole (C. I. Pigment Red 254), 1,4-diketo-2,5-dihydro-3,6-di-p-methylphenyl)pyrrolo[3,4-c]pyrrole, 1,4-diketo-2,5-dihydro-3,6-di-(methylphenyl)pyrrolo[3,4-c] pyrrole, 1,4-diketo-2,5-dihydro-3,6-di-(p-methylphenyl)-6-(m-methylphenyl)pyrrolo[3,4-c]pyrrole, C. I. Pigment Red 272, 1,4-diketo-2,5-dihydro-3,6-di-(p-tert butylphenyl)pyrrolo[3,4-c]pyrrole (C. I. Pigment Orange 73), 1,4-diketo-2,5-dihydro-3,6-di-p-biphenyl)pyrrolo[3,4-c]pyrrole (C. I. Pigment Red 264), 1,4-diketo-2,5-dihydro-3,6-di-(m-cyanophenyl)pyrrolo[3,4-c]pyrrole (C. I. Pigment Orange 71), 1,4-diketo-2,5-dihydro-3,6-di-(m-chlorophenyl)pyrrolo[3,4-c]pyrrole, etc. may be exemplified.

The above-described cyclic compounds are widely distributed in a commercial scene. In the present invention, these marketed products can be used as the cyclic compounds. As the marketed products, Graphtol Bordeaux HF3R or Graphtol Carmine HF4C as product names that are available from Clariant Japan K. K. may be exemplified.

As a method for producing the cyclic compound, a method disclosed in Japanese Patent Application Laid-Open No. 2001-207075 or a method of D. G. Farnum et al. in 1974 may be employed. More specifically, a method may be exemplified in which a mixture of succinic acid diester and benzonitrile is heated in an organic solvent, for instance, under the existence of a base such as sodium alcoholate to produce diketo pyrrolo pyrrole that is not substituted with substitutional groups. In such a method, when benzonitrile that is substituted with substitutional groups is employed in place of benzonitrile, various kinds of the diketo pyrrolo pyrrole into which the substitutional groups are introduced can be produced. In the above-described method, nitrile is selected so that pyrrolo pyrrole having no diaryl can be produced. Further, the cyclic compound used in the present invention can be produced by allowing bromo acetic acid ester to react with benzonitrile under the existence of a zinc catalyst (D. G. Farnum et al. in 1974).

As a phthalocyanine compound that may be substituted with the substitutional groups and include metal, for instance, (a) a copper phthalocyanine crystal that may be substituted with the substitutional groups and (b) a phthalocyanine compound that may be substituted with the substitutional groups and include one kind of metal selected from below described metals may be exemplified. The metals include zinc, cadmium, mercury, aluminum, germanium, gallium, indium, thallium, tin, lead, antimony, bismuth, lithium, sodium, potassium, rubidium, cesium, beryllium, magnesium, calcium, strontium, barium, scandium, yttrium, lanthanum, titanium, zirconium, hafnium, vanadium, niobium, tantalum, chromium, molybdenum, tungsten, manganese, technetium, rhenium, iron, ruthenium, osmium, cobalt, rhodium, iridium, nickel, palladium, platinum, copper, silver, gold, silicon, and cerium.

As the copper phthalocyanine crystal that may be substituted with the substitutional groups shown in the above-described (a), any of the crystals of the phthalocyanine compounds including copper may be employed without a special limitation in the present invention. A well-known crystal called a copper phthalocyanine crystal may be employed. For instance, the crystal of a compound expressed by a below-described formula may be exemplified.

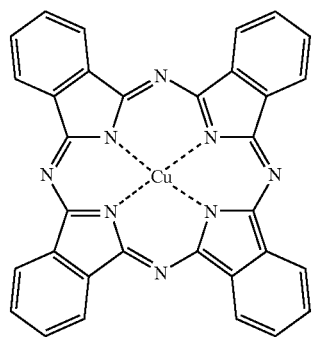

Further, in the present invention, the crystal of the substituted copper phthalocyanine obtained by substituting the above-described compound with the substitutional groups as much as chemically permissible may be also employed as the copper phthalocyanine crystal. For instance, halogenated copper phthalocyanine or the like may be exemplified. As the above-described halogenated copper phthalocyanine, a product is exemplified that is obtained by substituting a hydrogen of the benzene ring of the copper phthalocyanine with a chlorine. Further, halogen may be bromine, fluorine or iodine. As other substitutional groups than the halogen, alkyl groups such as methyl, ethyl, propyl, etc., alkoxy groups such as methoxy, ethoxy, etc., hydroxyl groups, amino groups, etc. may be exemplified.

As the phthalocyanine compound shown in the above-described (b), any of compounds having phthalocyanine groups including no metal or compounds having phthalocyanine groups including one kind of metal selected from below-described metals may be employed without a special limitation in the present invention. The above-described metals include zinc, cadmium, mercury, aluminum, germanium, gallium, indium, thallium, tin, lead, antimony, bismuth, lithium, sodium, potassium, rubidium, cesium, beryllium, magnesium, calcium, strontium, barium, scandium, yttrium, lanthanum, titanium, zirconium, hafnium, vanadium, niobium, tantalum, chromium, molybdenum, tungsten, manganese, technetium, rhenium, iron, ruthenium, osmium, cobalt, rhodium, iridium, nickel, palladium, platinum, copper, silver, gold, silicon and cerium. As the compounds having the phthalocyanine groups that do not include any of the above-described metals, for instance, a metal-free phthalocyanine expressed by a below-described formula and having no metal at a center or the like may be exemplified.

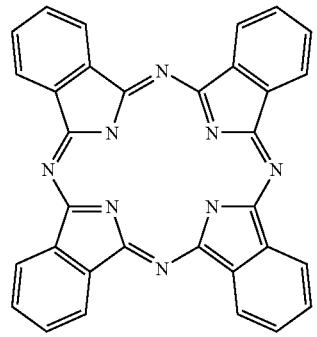

As the compounds having the phthalocyanine groups, a phthalocyanine compound expressed by a below-described formula and having metal at a center may be exemplified.

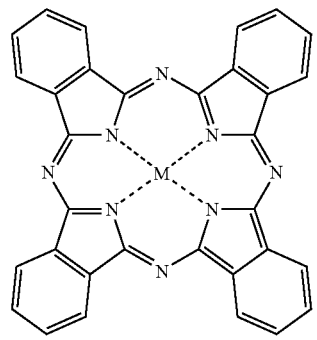

(In the formula, M represents one kind of metal selected from zinc, cadmium, mercury, aluminum, germanium, gallium, indium, thallium, tin, lead, antimony, bismuth, lithium, sodium, potassium, rubidium, cesium, beryllium, magnesium, calcium, strontium, barium, scandium, yttrium, lanthanum, titanium, zirconium, hafnium, vanadium, niobium, tantalum, chromium, molybdenum, tungsten, manganese, technetium, rhenium, iron, ruthenium, osmium, cobalt, rhodium, iridium, nickel, palladium, platinum, copper, silver, gold, silicon and cerium.)

Further, in the present invention, as the phthalocyanine compounds, well-known compounds referred to as the phthalocyanine compounds may be employed. For instance, metal-free phthalocyanine, titanyl phthalocyanine, aluminum phthalocyanine, vanadium phthalocyanine, cadmium phthalocyanine, antimony phthalocyanine, chromium phthalocyanine, germanium phthalocyanine, iron phthalocyanine, chloroaluminum phthalocyanine, chloroindium phthalocyanine, chlorogallium phthalocyanine, magnesium phthalocyanine, dialkyl phthalocyanine, tetramethyl phthalocyanine, tetraphenyl phthalocyanine, etc. may be employed. In the present invention, as the phthalocyanine compounds, marketed products such as metal-free phthalocyanine as a product name, aluminum phthalocyanine, titanyl phthalocyanine, iron phthalocyanine, cobalt phthalocyanine, or tin phthalocyanine (produced by Sanyo Color Works, Ltd.) may be employed. Further, in the present invention, an uranium complex (super-phthalocyanine) having five isoindole rings or a boron complex having three isoindole rings can be also used as the phthalocyanine compounds. The substituted phthalocyanine obtained by substituting the above-described phthalocyanine compound with the substitutional groups as much as chemically permissible may be also preferably employed as the phthalocyanine compound. For instance, most of the halogenated phthalocyanine is used as the pigment of green and marketed products may be employed. Further, halogen may be chlorine, bromine, fluorine or iodine. As other substitutional groups than the halogen, alkyl groups such as methyl, ethyl, propyl, etc., alkoxy groups such as methoxy, ethoxy, etc., hydroxyl groups, amino groups, etc. may be exemplified.

Most of the copper phthalocyanine and phthalocyanine compounds are capable of forming crystals by a regular molecular arrangement according to the forming condition. For instance, in the copper phthalocyanine, molecules are arranged in rows in one direction so as to pile cards and the rows may form a bundle to form a crystal. Manners in which the molecules are piled, that is, the inclination angles of the planes of the molecules relative to an axis and intermolecular distances, and the manners of the arrangements of the rows are different so that many kinds of crystal forms may be formed. The copper phthalocyanine crystal may have crystal forms, for instance, an alpha type, a beta type, a gamma type, a delta type, a sigma type, an epsilon type, a pie type, a rho type, a tau type, a chi type, or an R type. In the present invention, the copper phthalocyanine crystal preferably has the crystal form called the beta type or the epsilon type, from the reason why the ability of the nucleus agent of a crystalline polyester is high. The copper phthalocyanine crystal is frequently used as a pigment of blue and various kinds of crystal forms are available from the marketed products.

As a porphyrin compound that may be substituted with substitutional groups, any of compounds including a porphyrin group may be employed without a special limitation in the present invention. Further, a compound called a porphyrin compound may be used. For instance, a compound expressed by a below-described formula may be employed.

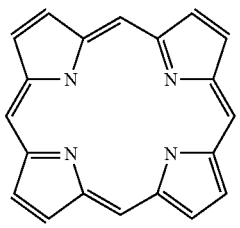

Further, a chlorophyll compound shown by a below-described formula can be employed.

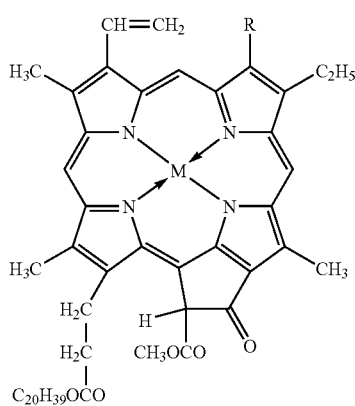

(In the formula, R represents a hydrocarbon group or halogen that may be substituted with substitutional groups.)

Further, a haemin compound expressed by a below-described formula or esters in carboxyl groups thereof may be employed.

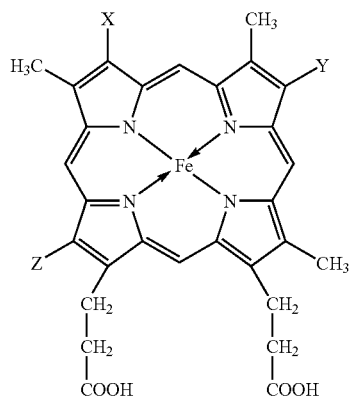

(In the formula, X, Y and Z are the same or different and represent hydrocarbon groups or halogens that may be substituted with substitutional groups.)

As the hydrocarbon groups that may be substituted with one or more of the above-described substitutional groups or the hydrocarbon groups that are not substituted with the above-described substitutional groups may be employed without a special limitation. As the "hydrocarbon group", for instance, an alkyl group, an alkenyl group, an alkynyl group, a cycloalkyl group, an aryl group, a cross-linked cyclic hydrocarbon group, etc. may be exemplified. As the "alkyl group", for instance, straight chain type or branching type alkyl groups may be exemplified (for instance, methyl, ethyl, n-propyl, isopropyl, n-butyl, isobutyl, sec-butyl, tert-butyl, n-pentyl, isoamyl, tert-amyl, n-hexyl, isohexyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl, n-eicosyl, n-docosyl, n-tetracosyl, etc.). As the "alkenyl group", straight chain type or branching type alkenyl groups may be exemplified, for instance, vinyl, propenyl (1-, 2-), butenyl (1-, 2-, 3), pentenyl, octenyl, butadienyl (1,3-) etc. As the "alkynyl group", straight chain type or branching type alkynyl groups may be exemplified, for instance, ethynyl, propynyl (1-, 2-), butynyl (1-, 2-, 3-), pentynyl, octynyl, decynyl, etc. As the "cycloalkyl group", for instance, cyclopropyl, cyclobutyl, cyclopentyl, cyclohexyl, cycloheptyl, cyclooctyl, etc. may be exemplified. As the "aryl group", monocyclic or polycyclic groups may be exemplified such as phenyl, biphenyl, naphthyl, anthryl, phenanthryl, acenaphthylenyl, etc. As the "cross-linked hydrocarbon group", for instance, 1-adamantyl, 2-adamantyl, 2-norbornanyl, 5-norbornene-2-yl, etc. may be exemplified. These cyclic compounds may be compounds into which the substitutional groups are introduced within a chemically permissible range and may be, for instance, halogenated materials or sulfonated materials.

In the resin component according to the present invention, the above-described cyclic compound preferably has a particle diameter of about 100 μm or smaller. The cyclic compound is more preferably a particle of a particle diameter of about 10 μm or smaller. In the present invention, the cyclic compound may be used as the nucleus agent for the polyester. When the cyclic compound is used as the nucleus agent, the cyclic compound may be diluted with a diluent such as a suitable solvent. In the present invention, the above-described cyclic compound is preferably a cyclic compound obtained by introducing benzimidazolone ring into naphthol AS to allow an obtained product to react as a coupling component (called a naphtholon).

Further, as the resin component forming the molded body produced by a producing method according to the present invention, the resin component as described below can be employed.

In the resin component, the cyclic compound having a condensed azo structure is added to the biodegradable polyester as the polyester capable of having the crystal structure as the nucleus agent to accelerate a crystallization. The cyclic compound having the condensed azo structure has a compound having two or more azo groups obtained by condensing an azo compound. Such a cyclic compound effectively serves as the nucleus agent for accelerating the crystallization of the polyester.

As the cyclic compound having the condensed azo structure, for instance, a condensed azo compound expressed by a below-described formula may be exemplified. In the condensed azo compound, an effect of the nucleus agent for accelerating the crystallization of the polyester is high.

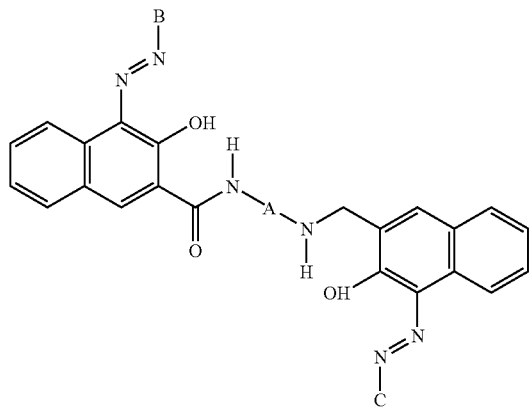

Now, the condensed azo compound expressed by the above-described formula will be described below. In the above-described formula, A represents a bivalent connecting chain, for instance, a bivalent cyclic hydrocarbon group having aromatic rings, aliphatic rings, pentagonal rings or the like, a straight chain type bivalent hydrocarbon group, or a bivalent heterocyclic group. As the bivalent hydrocarbon groups, specifically, below-described bivalent hydrocarbon groups may be exemplified. They include alkylene groups (for instance, methylene, methyl methylene, dimethyl methylene, ethylene, propylene, trimethylene, tetramethylene, pentamethylene, hexamethylene, heptamethylene, octamethylene, butylene group, 2-methyl propylene group, pentamethylene group, pentylene group, 2-methyl tetramethylene group, 2,2-dimethyl trimethylene group, 2-ethyl trimethylene group, hexamethylene group, hexylene group, 2-methyl pentamethylene group, 3-methyl pentamethylene group, heptamethylene group, heptylene group, octamethylene group, octylene group, 2-ethyl hexylene group, nonamethylene group, nonylene group, decamethylene group, decylene group, cyclopropylene, 1,2-cyclobutylene, 1,3-cyclobutylene, cyclopentylene, 1,3-cyclopentylene, cyclohexylene, 1,3-cyclohexylene, 1,4-cyclohexylene, etc.), alkenylene groups (for instance, vinylene, propenylene, 1-propene-1,2-ylene, 2-propene-1,2-ylene, butenylene (for instance, 1-butene-1,4-ylene, 2-butene-1,4-ylene, etc.), pentenylene (for instance, 1-pentene-1,5-ylene, 2-pentene-1,5-ylene, etc.), hexenylene (for instance, 1-hexene-1,6-ylene, 2-hexene-1,6-ylene, 3-hexene-1,6-ylene, etc.), cyclopropenylene (for instance, 1-cyclopropene-1,2-ylene, 2-cyclopropene-1,2-ylene, etc.), cyclobutenylene (for instance, 1-cyclobutene-1,2-ylene, 1-cyclobutene-1,3-ylene, 2-cyclobutene-1,2-ylene, 3-cyclobutene-1,2-ylene, etc.), cyclopentenylene (for instance, 1-cyclopentene-1,2-ylene, 1-cyclopentene-1,3-ylene, 2-cyclopentene-1,2-ylene, 3-cyclopentene-1,2-ylene, 3-cyclopentene-1,3-ylene, 4-cyclopentene-1,3-ylene, etc.), cyclohexenylene (for instance, 1-cyclohexene-1,2-ylene, 1-cyclohexene-1,3-ylene, 1-cyclohexene-1,4-ylene, 2-cyclohexene-1,2-ylene, 2-cyclohexene-1,4-ylene, 3-cyclohexene-1,2-ylene, 3-cyclohexene-1,3-ylene, 4-cyclohexene-1,2-ylene, 4-cyclohexene-1,3-ylene, etc.), etc.), alkenylene groups (for instance, ethynylene, propynylene, 1-butynylene, 2-butynylene, 1-pentynylene, 2-pentynylene, 3-pentynylene, etc.), cycloalkylene groups (for instance, 1,4-cyclohexylene, etc.), phenylene groups (for instance, o-phenylene, m-phenylene, p-phenylene, etc.), naphthylene groups, etc. Further, bivalent monocyclic type or polycyclic type heterocyclic groups may be exemplified that are formed by removing hydrogen atoms from the rings of furan, pyrrole, pyridine, pyrimidine, thiophene, pyrrolidine, piperidine, pyrazine, quinoline, isoquinoline, etc. Further, the connecting chain A may not be present and nitrogen atoms may be directly connected together.

Further, the bivalent connecting chain A may have substitutional groups. In this case, the substitutional groups specifically include groups described below. For instance, they include halogen atoms (for instance, fluorine, chlorine, bromine, iodine, etc.), a nitro group, a cyano group, a hydroxy group, a thiol group, a sulfo group, a sulfino group, a mercapto group, a phosphono group, a strain chain type or branching type alkyl group (for instance, a methyl group, an ethyl group, an isopropyl group, an n-propyl group, an n-butyl group, an isobutyl group, a secondary butyl group, a tertiary butyl group, a pentyl group, a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl, an eicosyl group, etc.), a hydroxy alkyl group (for instance, a hydroxy methyl group, a hydroxy ethyl group, 1-hydroxy isopropyl group, 1-hydroxy-n-propyl group, 2-hydroxy-n-butyl group, 1-hydroxy-isobutyl group, etc.), a halogenoalkyl group (for instance, chloromethyl, dichloromethyl, trichloromethyl, fluoromethyl, difluoromethyl, trifluoromethyl, 2-bromoethyl, 2,2,2-trifluoroethyl, pentafluoroethyl, 3,3,3-trifluoropropyl, 4,4,4-trifluorobutyl, 5,5,5-trifluoropentyl, 6,6,6-trifluorohexyl, etc.), a cycloalkyl group (for instance, cyclopropyl, cyclobutyl, cyclopentyl, cyclohexyl, cycloheptyl, etc.), an alkenyl group (for instance, vinyl, crotyl, 2-pentenyl, 3-hexenyl, etc.), a cycloalkenyl group (for instance, 2-cyclopentenyl, 2-cyclohexenyl, 2-cyclopentenyl methyl, 2-cyclohexenyl methyl, etc.), an alkynyl group (for instance, ethynyl, 1-propynyl, 2-propynyl, 1-butynyl, 2-pentynyl, 3-hexynyl, etc.), an oxo group, a thioxo group, an amidino group, an imino group, an alkylenedioxy group (for instance, methylenedioxy, ethylenedioxy, etc.), an aromatic hydrocarbon group, for instance, a monocyclic aromatic or polycyclic aromatic hydrocarbon group such as phenyl, biphenyl, etc., a cross-linked hydrocarbon group such as 1-adamantyl group, 2-norbornanyl, etc., an alkoxy group (for instance, methoxy, ethoxy, propoxy, isopropoxy, butoxy, isobutoxy, sec-butoxy, tert-butoxy, pentyloxy, neopentyloxy, hexyloxy, etc.), an alkylthio group (for instance, methylthio, ethylthio, propylthio, isopropylthio, butylthio, isobutylthio, pentylthio, hexylthio, etc.), a carboxyl group, an alkanoyl group (for instance, formyl; acetyl, propionyl, butyryl, isobutyryl, etc.), an alkanoyloxy group (for instance, formyloxy; alkyl-carbonyloxy groups such as acetyloxy, propionyloxy, butyryloxy, isobutyryloxy, etc.), an alkoxy carbonyl group (for instance, methoxy carbonyl, ethoxy carbonyl, propoxy carbonyl, butoxy carbonyl, etc.), an aralkyloxy carbonyl group (for instance, benzyloxy carbonyl, etc.), a thiocarbamoyl group, an alkyl sulfinyl group (for instance, methyl sulfinyl, ethyl sulfinyl, etc.), an alkyl sulfonyl group (for instance, methyl sulfonyl, ethyl sulfonyl, butyl sulfonyl, etc.), a sulfamoyl group, a mono-alkyl sulfamoyl group (for instance, methyl sulfamoyl, ethyl sulfamoyl, etc.), a di-alkyl sulfamoyl group (for instance, dimethyl sulfamoyl, diethyl sulfamoyl, etc.), an aryl sulfamoyl group (for instance, phenyl sulfamoyl, naphthyl sulfamoyl, etc.), an aryl group (for instance, phenyl, naphthyl, etc.), an aryloxy group (for instance, phenyloxy, naphthyloxy, etc.), an arylthio group (for instance, phenylthio, naphthylthio, etc.), an aryl sulfinyl group (for instance, phenyl sulfinyl, naphthyl sulfinyl, etc.), an aryl sulfonyl group (for instance, phenyl sulfonyl, naphthyl sulfonyl, etc.), an aryl carbonyl group (for instance, benzoyl, naphthoyl, etc.), an aryl carbonyloxy group (for instance, benzoyloxy, naphthoyloxy, etc.), an alkyl carbonyl amino group that may be halogenated (for instance, acetyl amino, trifluoro acetyl amino, etc.), a carbamoyl group that may have a substitutional group (for instance, a group represented by a formula —$CONR_1R_2$ (in the formula, $R_1$ and $R_2$ respectively show a hydrogen atom, hydrocarbon groups that may have a substitutional group or heterocyclic groups that may have a substitutional group. Further, $R_1$ and $R_2$ may form rings together with an adjacent nitrogen atom)), an amino group that may have a substitutional group (for instance, amino, alkyl amino, tetrahydro pyrrole, piperazine, piperidine, morpholine, thiomorpholine, pyrrole, imidazole, etc.), an ureide group that may have a substitutional group (for instance, a group represented by a formula —$NHCONR_1R_2$ (in the formula, $R_1$ and $R_2$ show the same meanings as those described above), etc.), a carboxamide group that may have a substitutional group (for instance, a group represented by a formula —$NR_1COR_2$ (in the formula, $R_1$ and $R_2$ show the same meanings as those described above), etc.), a sulfonamide group that may have a substitutional group (for instance, a group represented by a formula —$NR_1SO_2R_2$ (in the formula, $R_1$ and $R_2$ show the same meanings as those described above), etc.), a hydroxyl group or a mercapto group that may have a substitutional group, a heterocyclic group that may have a substitutional group (for instance, an aromatic heterocyclic group (for instance, pyridyl, furyl, thiazolyl, etc.) that includes at least one of one to three kinds of hetero atoms selected from oxygen atoms, sulfur atoms, and nitrogen atoms except carbon atoms as, for instance, atoms (cyclic atoms) forming a cyclic system, or a saturated or unsaturated aliphatic heterocyclic group, etc.), or substitutional groups with which these substitutional groups are substituted as much as chemically permissible.

In the above-described formula, substitutional groups B and C bonded to azo groups are, for instance, monovalent aromatic groups that may be substituted with other substitutional groups or may not be substituted with other substitutional groups. At this time, the substitutional groups B and C are the same substitutional groups or different substitutional groups. It is important for the substitutional groups B and C to have plane structures. For instance, aromatic hydrocarbon groups including monocyclic or polycyclic groups such as a phenyl group, a naphthyl group, an anthryl group, an indenyl group, a pyrenyl group, a phenanthryl group, etc. or monocyclic or polycyclic aromatic heterocyclic groups, for instance, pyridyl, pyrrolyl, imidazoyl, thienyl, furyl, etc. of aromatic heterocyclic groups that include at least one of one to three kinds of hetero atoms selected from oxygen atoms, sulfur atoms, and nitrogen atoms except carbon atoms may be exemplified. However, it is to be understood that the present invention is not limited thereto.

When the above-described substitutional groups B and C are the aromatic groups that may be substituted with other substitutional groups, as substitutional groups possessed by the substitutional groups B and C, the substitutional groups may be selected, in case the above-described connecting chain A has the substitutional groups, from the same substitutional groups as those enumerated in the description concerning the substitutional groups. Accordingly, an explanation thereof is omitted.

In the condensed azo compound expressed by the above-described formula, the bivalent connecting chain A is preferably a bivalent aromatic hydrocarbon group, and more preferably a phenylene group that may be substituted with other substitutional groups or may not be substituted with other substitutional groups. The substitutional groups B and C are preferably the phenyl group that may be substituted with other substitutional groups or may not be substituted with other substitutional groups.

As the condensed azo compound, a pigment is known. For instance, condensed azo pigments such as an yellow type, an orange type, a red type, a brown type, etc. are representative examples. More specifically, C. I. pigment Orange 31, C. I. Pigment Red 144, C. I. Pigment Red 166, C. I. Pigment Red 214, C. I. Pigment Red 220, C. I. Pigment Red 221, C. I. Pigment Red 242, C. I. Pigment Brown 23, etc. may be exemplified. Here, C. I. means a color index issued by The Society of Dyers and Colourists.

Connecting chains A and substitutional groups B and C in these condensed azo pigments are shown in Table 1.

TABLE 1

| A | B, C | C. I. Name |
|---|---|---|
| [structure] | [structure] | P. O. 31 |
| [structure] | [structure] | P. R. 144 |
| [structure] | [structure] | P. R. 166 |

TABLE 1-continued

| A | B, C | C. I. Name |
|---|---|---|
| 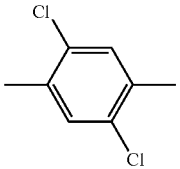 | 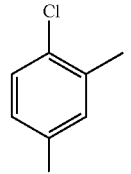 | P. R. 214 |
| 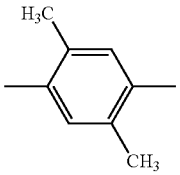 | 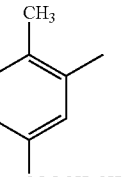 | P. R. 220 |
| 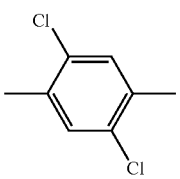 | 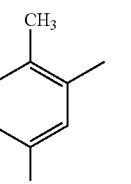 | P. R. 221 |
| 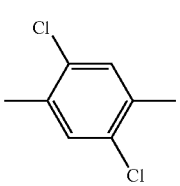 | 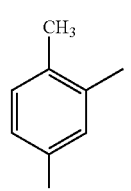 | P. R. 242 |
| 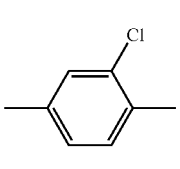 | 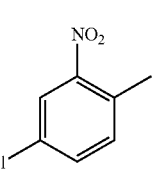 | P. Br. 23 |

The enumerated condensed azo pigments are widely distributed in the market. For instance, the C. I. Pigment Red 144 is available as a trade name of PV Fast Red 3B produced by Clariant Japan K. K. and as a trade name of CROMOPHTAL Red BT or the like produced by Ciba Specialty Chemicals Corporation. The C. I. Pigment Red 166 is available as CROMOPHTAL Scarlet RT or the like produced by Ciba Specialty Chemicals Corporation. The C. I. Pigment Red 214 is available as a trade name of CROMOPHTAL Red BN or the like produced by Ciba Specialty Chemicals Corporation. The C. I. Pigment Red 242 is available as PV Fast Scarlet 4RF or the like produced by Clariant Japan K. K. The C. I. Pigment Brown 23 is available as CROMOPHTAL Brown 5R or the like produced by Ciba Specialty Chemicals Corporation.

In addition thereto, in C. I. Pigment Red 262, an effect of a nucleus agent is recognized. The detail of the structure of the C. I. Pigment Red 262 is not clear. However, the C. I. Pigment Red 262 is the cyclic compound having the condensed azo structure like the condensed azo compound expressed by the above-described formula and serves as the nucleus agent for accelerating the crystallization of the polyester. As for the C. I. Pigment Red 262, marketed products may be employed. For instance, the C. I. Pigment Red 262 is available as a trade name of Graphtol Red 2BN or the like produced by Clariant Japan K. K.

When the above-described cyclic compound having the condensed azo structure is used as the nucleus agent, the cyclic compound may be directly mixed with the polyester or diluted with a diluent such a suitable solvent.

As the polyester to be crystallized in the present invention, any of polymer compounds that have at least one ester bond and are capable of having the crystal structure may be employed and well-known polymer compounds may be employed. Herein, as "the polyester capable of having the crystal structure", a polyester capable of partly having a crystal structure may be employed without a special limitation. A polyester in which all molecular chains cannot be necessarily regularly arranged may be employed. Any of polyesters in which all molecular chains do not have a regularity, however, a part of molecular chain segments can be oriented may be employed. Accordingly, the polyester capable of having the crystal structure is preferably formed in a straight chain shape, however, may be formed in a branch shape. Further, in the present invention, the polyester capable of having the crystal structure is preferably a biodegradable polyester. As such a biodegradable polyester, for instance, polyester resins or the like that are metabolized by microorganisms may be exemplified. An aliphatic polyester having a moldability, a heat resistance, and an impact resistance with good balance is preferably used among them.

As the aliphatic polyester, for instance, polyoxalic acid, polysuccinic acid, polyhydroxy butyric acid, polydiglycolic acid, polycaprolactone, polydioxanone, polylactic acid aliphatic polyester, etc., may be exemplified. The aliphatic polyester is preferably the polylactic acid aliphatic polyester among them. As the polylactic acid aliphatic polyester, for instance, polymers of hydroxy acids such as lactic acid, malic acid, glycolic acid, or copolymers of them, etc. may be exemplified. The polylactic acid aliphatic polyester is preferably a hydroxycarboxylic acid aliphatic polyester among them. In the present invention, the above-described hydroxycarboxylic acid aliphatic polyester is most preferably polylactic acid.

In the present invention, the biodegradable polyester can be produced in accordance with a well-known method. As the above-described producing method, any of methods by which the biodegradable polyester can be produced may be employed. For instance, methods such as a lactide method, a polycondensation of polyhydric alcohol and polybasic acid, or an intermolecular polycondensation of hydroxycarboxylic acid having a hydroxyl group and a carboxyl group in molecules may be exemplified.

The polylactic acid aliphatic polyester may be ordinarily produced by a method in accordance with a ring-opening polymerization of lactide as a cyclic diester and corresponding lactones, what is called a lactide method. Further, the polylactic acid aliphatic polyester may be produced by a direct dehydration condensation method of lactic acid except the lactide method. Examples of a catalyst for producing the polylactic acid aliphatic polyester are, tin, antimony, zinc, titanium, iron, or aluminum compounds. A tin type catalyst and an aluminum type catalyst are preferred, especially a tin octylate and aluminum acetyl acetonate.

Poly L-lactic acid obtained by the lactide ring-opening polymerization is preferable among the polylactic acid aliphatic polyesters, because the poly L-lactic acid is hydrolyzed to become L-lactic acid and its safety is recognized. However, the polylactic acid aliphatic polyester used in the present invention is not limited thereto and the lactide used for producing the polylactic acid aliphatic polyester is not limited to L forms. Further, in the present invention, as the biodegradable polyester, marketed goods, for instance, the name of a product of H100J (produced by Mitsui Chemicals, Inc.) may be employed.

The resin component according to the present invention may further include a polyester that does not necessarily have a crystal structure or other biodegradable resins or the like as resin component parts. As the biodegradable resins, polysaccharide derivatives such as cellulose, starch, dextran or chitin, peptides such as collagen, casein, fibrin or gelatin, polyamides such as polyamino acid, polyvinyl alcohol, nylon 4 or nylon 2/nylon 6 copolymer, polyesters known as materials that do not necessarily have a crystal structure, for instance, polyglycolic acid, polylactic acid, polysuccinic acid ester, polyoxalic acid ester, polyhydroxy butyric acid, polydiglycolic acid butylene, polycaprolactone, polydioxanone, etc. may be exemplified. There are many kinds of biodegradable resins and they can be used in the present invention. That is, biodegradable polymers are organic materials that are decomposed under the action of the natural world or organisms and assimilated therewith. Accordingly, the biodegradable polymers are ideal materials adapted to an environment. Thus, any of materials that do not harm the object of the present invention may be employed.

In the present invention, the biodegradable resins can be produced in accordance with a well-known method. Further, as the biodegradable resins, marketed goods may be used. As such marketed goods, for instance, a trade name of Lacty available from Toyota Motor Corporation, a trade name of Lacea available from Mitsui Chemicals, Inc. or a trade name of Nature Works available from Cargill Dow Polymer LLC may be exemplified.

The resin component according to the present invention may include only one kind of resin of the above-described biodegradable resins or two or more kinds of biodegradable resins. When the two or more kinds of biodegradable resins are included in the resin component, these resins may form a copolymer or may be mixed together. Further, other resins than the above-described biodegradable resins may be included in the resin component according to the present invention. For instance, a synthetic resin or the like having no biodegrading property may be included in the resin component according to the present invention. As the synthetic resin, for instance, polylactic acid whose decomposition speed is moderated or polybutylene succinate, etc. may be exemplified.

The crystallization temperature of the resin component according to the present invention is higher than the crystallization temperature of ordinary polyesters and comes near to a melting point. That is, the resin component is hardly supercooled. Accordingly, the resin component according to the present invention shows a property that the resin component is easily crystallized. Specifically, in the resin component according to the present invention, the crystallization temperature can be set to a range within −55° C. of the melting point.

In the resin component according to the present invention, the cyclic compound having the condensed azo structure that is used as the nucleus agent preferably has a particle form with the particle diameter exceeding 0 and not larger than 10 μm, and more preferably has a particle form with the particle diameter not larger than 1 μm. Further, in the present invention, the ratio of the cyclic compound having the condensed azo structure in the resin component is preferably within a range from about 0.001 parts by weight to 10 parts by weight relative to 100 parts by weight of the polyester capable of having the crystal structure and more preferably within a range from about 0.01 parts by weight to 1 part by weight.

Now, optimum ranges of the amount of addition and the particle diameter of the cyclic compound having the condensed azo structure will be described below in detail.

When the amount of addition of the nucleus agent is equal, the particle diameter of the nucleus agent is desirably decreased as much as possible, because as the particle diameter of the nucleus agent grows smaller, the number of the particles of the nucleus agent is more increased. For instance, in case the amount of the addition of the nucleus agent is equal, when the particle diameter of the nucleus agent becomes ½ times as large as the particle diameter, the volume of one particle becomes ⅛ times as much as the volume. Thus, the number of the particles becomes 8 times as many as that of the particles. That is, when the particle diameter becomes ½ times as large as the particle diameter, even if the amount of addition of the nucleus agent is decreased to ⅛ times as much as the amount of addition of the nucleus agent, the substantially same effect can be anticipated. It is to be understood that when the particle diameter is equal, a larger amount of addition of the nucleus agent is preferable in view of an effect as the nucleus agent.

Under these preconditions, the optimum range of the particle diameter or the amount of addition of the nucleus agent will be described below. Here, a simple model is considered and it is assumed that below-described items are realized.

(1) To simplify a calculation, it is assumed that the density of the polyester resin capable of having the crystal structure and the nucleus agent is the same.

(2) It is assumed that the particles of the nucleus agent are not aggregated and completely homogeneously dispersed in the resin (present in the form of a cubic lattice).

(3) It is assumed that the crystal of the polyester resin capable of having the crystal structure has a cubic form.

(4) It is assumed that the particle of the nucleus agent also has the cubic form.

(5) It is assumed that one resin crystal is produced from one nucleus agent.

Thus, from the amount of addition (%) of the nucleus agent and the particle diameter of the nucleus agent, the size of the crystal of the resin can be obtained by calculating a volume as shown in a following Table 2. For instance, assuming that the size of the nucleus agent (length of one side) is 0.05 μm, the amount of addition of the nucleus agent is 0.5%, and the size of the crystal of the polylactic acid (PLLA) is X μm, the size X of the crystal of the polylactic acid is calculated as 0.29 μm from X3*0.005=0.053.

TABLE 2

| | | Size of Crystal of PLLA (μm) | | | | | | |
|---|---|---|---|---|---|---|---|---|
| | | Particle diameter of nucleus agent (μm) | | | | | | |
| | | 0.01 | 0.05 | 0.1 | 0.5 | 1 | 5 | 10 |
| Amount of addition of nucleus agent | 0.001% | 0.46 | 2.3 | 4.6 | 23 | 46 | 232 | 464 |
| | 0.01% | 0.22 | 1.1 | 1.3 | 6 | 13 | 108 | 215 |
| | 0.10% | 0.1 | 0.5 | 1 | 5 | 10 | 50 | 100 |
| | 1.00% | 0.05 | 0.2 | 0.5 | 2 | 5 | 23 | 46 |
| | 10% | 0.02 | 0.1 | 0.2 | 1 | 2 | 11 | 22 |

Actually, the particle diameter or the amount of addition of the nucleus agent may be selected so as to obtain a necessary size of the crystal that suits for the purpose. For instance, a consideration is directed to a case that the polyester resin capable of having the crystal structure is the polylactic acid, temperature at which the polyester resin is crystallized is 120° C. and a crystallization time is desired to be set to a range within about 1 minute or shorter. According to documents or the experiments by the inventors, the growth speed (dr/dt) of the radius (r) of the spherulite of the polylactic acid at this temperature is about 2 μm/minute. Here, as a further assumption, it is assumed that the growth speed of the radius of the spherulite is the same as the growth speed of the crystal having the cubic form assumed as described above. Then, as shown in Table 3, the time necessary for crystallization can be calculated. For instance, when the particle diameter of the nucleus agent is 1 μm and the amount of addition of the nucleus agent is 1%, the crystallization time is calculated as 70 seconds.

TABLE 3

| | Crystallization time at 120° C. (second) | | | | | | |
|---|---|---|---|---|---|---|---|
| | Particle diameter of nucleus agent (μm) | | | | | | |
| | 0.01 | 0.05 | 0.1 | 0.5 | 1 | 5 | 10 |
| Amount of addition of nucleus agent | 0.001% | 7 | 35 | 70 | 348 | 696 | 3481 | 6962 |
| | 0.01% | 3.2 | 16 | 19 | 94 | 189 | 1616 | 3232 |
| | 0.10% | 1.5 | 8 | 15 | 75 | 150 | 750 | 1500 |
| | 1.00% | 0.7 | 3 | 7 | 35 | 70 | 348 | 696 |
| | 10% | 0.3 | 2 | 3 | 16 | 32 | 162 | 323 |

The amount of addition of the nucleus agent is preferably set to about 10% at maximum, because when the amount of addition of the nucleus agent exceeds this range, the mechanical characteristics of the resin are frequently caused to be deteriorated. In this case, when the particle diameter of the nucleus agent is 10 μm, the crystallization time is calculated as about 5 minutes in accordance with the above-described calculating example. For instance, when this resin is crystallized in a metal mold whose temperature is set to about 120° C. by an injection molding machine, a time necessary for crystallizing the resin is estimated to be 5 minutes. On the other hand, the resin resides in the cylinder of the molding machine in a molten state at high temperature. The residence time of the resin is ordinarily set to a time within 5 minutes from the viewpoint of a thermal decomposition. Accordingly, the above-described amount of addition of 10% for the particle diameter of 10 μm of the nucleus agent indicates a boundary condition satisfying the above-described requirement.

Ordinarily, when the particle diameter of the nucleus agent is small, aggregation is generated so that the dispersion of the nucleus agent in the resin is deteriorated. Thus, the nucleus agent is maldistributed. Conversely, the particle diameter is substantially increased. When the particle diameter of the nucleus agent is not larger than about 0.5 μm, which depends on the kind of the nucleus agent, the nucleus agent is hardly aggregated and relatively easily dispersed in the resin. In this case, to set the crystallization time to a time within a range of about 5 minutes in accordance with the above-described calculating example, a lower limit of the amount of addition of the nucleus agent is calculated as about 0.001%. It is to be understood that even when the particle diameter is smaller than 0.5 μm, the nucleus agent may be hardly aggregated depending on the kind of the nucleus agent. In this case, the amount of addition of the nucleus agent can be more reduced. Otherwise, when the nucleus agent having a smaller particle size is used, the dispersion of the nucleus agent in the resin can be improved and the amount of addition of the nucleus agent can be reduced by employing some aggregation inhibitor.

The above-described calculations and estimations are based on many assumptions. Actually, the nucleus agent may be aggregated or may not be completely homogeneously dispersed. An actual effect of the nucleus agent is considered to be smaller than the above-described calculation. Therefore, a larger amount of addition of the nucleus agent than the calculated value is anticipated to be necessary. However, the amount of addition of the nucleus agent is preferably set to a value not higher than about 1%. Accordingly, the amount of addition of the nucleus agent is preferably within a range from 0.01% to 1%. That is, the amount of addition of the nucleus agent is preferably set to 0.01 parts by weight to 1 part by weight relative to the resin of 100 parts by weight.

In the above-described resin component, an inorganic filler may be further added as the nucleus agent.

The inorganic filler used herein may be well-known materials. For instance, talc, alumina, silica, magnesia, mica, kaolin, etc. may be exemplified. Since the talc among them is used together with the cyclic compound employed in the present invention to effectively accelerate the crystallization without canceling the effects of them each other, the talc is more preferably used.

Further, the inorganic filler of about 1 to 50 parts by mass is preferably added relative to the polyester of 100 parts by mass that is capable of having the crystal structure. The above-described range of the inorganic filler can avoid the obtained resin component from being brittle.

It is important to suppress the hydrolysis of the polyester in view of reliability for a long time in using a molded body. Accordingly, in the resin component according to the present invention, a hydrolysis inhibitor is preferably added. As the hydrolysis inhibitor, any of the hydrolysis inhibitors that can suppress the hydrolysis of the biodegradable resin may be employed without a special limitation. For instance, a compound having a reactivity with an active hydrogen in the biodegradable resin may be exemplified. The above-described compound is added so that an amount of active hydrogen in the biodegradable resin can be reduced to prevent the active hydrogen from catalytically hydrolyze a polymer chain that forms the biodegradable resin. Here, the active hydrogen means hydrogen in bonds (N—H bond or O—H bond) to oxygen, nitrogen and hydrogen. This hydrogen has a reactivity higher than that of hydrogen in a bond (C—H bond) of carbon and hydrogen. More specifically, hydrogens in, for instance, a carboxyl group: —COOH, a hydroxyl group: —OH, an amino group: —NH$_2$, an amide bond: —NHCO— etc. may be exemplified.

To the hydrolysis inhibitor, for instance, carbodiimide compounds, isocyanate compounds, oxazoline compounds or the like may be applied. Particularly, the carbodiimide compounds can be molten and kneaded with a biodegradable polymer compound and a small amount of the carbodiimide compound is added to the biodegradable resin so that the hydrolysis of the biodegradable resin can be more suppressed. Thus, the carbodiimide compounds are preferable.

The carbodiimide compound is a compound having one or more carbodiimide groups in a molecule and also includes a polycarbodiimide compound. As a monocarbodiimide compound included in the carbodiimide compounds, dicyclohexyl carbodiimide, diisopropyl carbodiimide, dimethyl carbodiimide, diisobutyl carbodiimide, dioctyl carbodiimide, diphenyl carbodiimide, naphthyl carbodiimide, etc. may be exemplified. Especially, dicyclohexyl carbodiimide or diisopropyl carbodiimide that is industrially easily available is preferable among them.

As the isocyanate compounds, for instance, 2,4-tolylene diisocyanate, 2,6-tolylene diisocyanate, m-phenylene diisocyanate, p-phenylene diisocyanate, 4,4'-diphenyl methane diisocyanate, 2,4'-diphenyl methane diisocyanate, 2,2'-diphenyl methane diisocyanate, 3,3'-dimethyl-4,4'-biphenylene diisocyanate, 3,3'-dimethoxy-4,4'-biphenylene diisocyanate, 3,3'-dichloro-4,4'-biphenylene diisocyanate, 1,5-naphthalene diisocyanate, 1,5-tetrahydro naphthalene diisocyanate, tetramethylene diisocyanate, 1,6-hexamethylene diisocyanate, dodecamethylene diisocyanate, trimethyl hexamethylene diisocyanate, 1,3-cyclohexylene diisocyanate, 1,4-cyclohexylene diisocyanate, xylylene diisocyanate, tetramethyl xylylene diisocyanate, hydrogenated xylylene diisocyanate, lysine diisocyanate, isophorone diisocyanate, 4,4'-dicyclohexyl methane diisocyanate, 3,3'-dimethyl-4,4'-dicyclohexyl methane diisocyanate, etc. may be exemplified.

As the oxazoline compounds, for instance, 2,2'-o-phenylene bis(2-oxazoline), 2,2'-m-phenylene bis(2-oxazoline), 2,2'-p-phenylene bis(2-oxazoline), 2,2'-p-phenylene bis(4-methyl-2-oxazoline), 2,2'-m-phenylene bis(4-methyl-2-oxazoline), 2,2'-p-phenylene bis(4,4'-dimethyl-2-oxazoline), 2,2'-m-phenylene bis (4,4'-dimethyl-2-oxazoline), 2,2'-ethylene bis (2-oxazoline), 2,2'-tetramethylene bis(2-oxazoline), 2,2'-hexamethylene bis(2-oxazoline), 2,2'-octamethylene bis (2-oxazoline), 2,2'-ethylene bis(4-methyl-2-oxazoline), 2,2'-diphenylene bis(2-oxazoline), etc. may be exemplified.

The above-described hydrolysis inhibitors can be easily produced in accordance with a well-known method and marketed products can be suitably employed.

Since the biodegrading speed of the resin component can be adjusted in accordance with the kinds or the amount of addition of the hydrolysis inhibitor used in the present invention, the kind and the amount of compounding of the hydrolysis inhibitor may be determined depending on a desired product. Specifically, the amount of addition of the hydrolysis inhibitor is ordinarily about 5 mass % or lower, or preferably about 1 mass % exceeding 0 relative to the total mass of the resin component. Further, as the hydrolysis inhibitor, a single of the above-described compounds may be used or two kinds or more of them may be used together.

In the resin component according to the present invention, as long as the crystallization and crystallinity are not extremely harmed, various kinds of additive agents that have been hitherto well-known may be mixed, for instance, an antioxidant, a light stabilizer, an ultraviolet absorber, a pigment, a colorant, an antistatic agent, a mold releasing agent, a perfume, a lubricant, a flame retardant, a filler, or antibacterial and antifungal agent.

When the resin component according to the present invention includes other components such as the above-described crystallizing nucleus agent, the inorganic filler, the hydrolysis inhibitor or various kinds of additive agents as well as the polyester capable of having the crystal structure, the resin component may be produced by mixing the polyester capable of having the crystal structure with the above-described other components. As a preferable producing method, for instance, a method may be exemplified in which the biodegradable resin as a material is mixed with the inorganic filler or the hydrolysis inhibitor as desired and the mixture is molten and kneaded by using an extruder. Further, as a method for producing the resin component according to the present invention, what is called a solution method may be employed. The solution method stated herein is a method in which an arbitrary solvent capable of dispersing and dissolving components respectively is used to completely agitate the components and the solvent as materials and prepare a slurry, and the solvent is removed by a well-known method such as drying.

The method for producing the resin component according to the present invention is not limited thereto and other methods than the above-described methods that have been hitherto known may be employed.

In the resin component according to the present invention, it is important to homogeneously and finely disperse the above-described cyclic compound in the biodegradable polyester. To homogeneously disperse the cyclic compound, a usually well-known method may be employed. For instance, a method in which the pigment is dispersed in the resin to color the resin may be employed. Further, for instance, a method in which three rolls are used may be exemplified. Otherwise, a method in which simple heating and kneading operations are repeated a plurality of times may be exemplified.

In the resin component according to the present invention, the ratio of the above-described cyclic compound is preferably within a range from about 0.001 to 10 parts by mass relative to 100 parts by mass of the polyester capable of having the crystal structure, and more preferably within a range from about 0.01 to 1 parts by mass. Further, in the resin component according to the present invention, the rate of crystallization is preferably within a range from about 40 to 100%. The crystallization time is preferably within a range from about 0 to 200 seconds. A modulus of viscoelasticity at 80° C. is preferably within a range from about 50 to 5000 MPa. Here, the rate of crystallization and the crystallization time are respectively obtained with reference to below-described examples. The modulus of viscoelasticity is obtained by a measuring method to which a below-described tension elasticity measurement and a bending elasticity measurement are applied.

Test piece: length of 50 mm×width of 7 mm×thickness of 1 mm

Measuring device: viscoelasticity analyzer RSA-II (produced by Rheometric Scientific FE, Ltd.)

Measuring geometry: Dual Cantilever Bending

Frequency: 6.28 (rad/s)

Measurement start temperature: 0(° C.)

Measurement final temperature: 160(° C.)

Temperature rise speed: 5(° C./min)

Distortion: 0.05(%)

Specific examples of the resin component according to the present invention are shown below.

Example 1

In an Example 1 of the resin component according to the present invention, H100J of polylactic acid (produced by Mitsui Chemicals, Inc.) was used as the polyester capable of having the crystal structure. The polylactic acid had a molecular weight of 200000.

As the cyclic compound serving as the nucleus agent, C. I. Pigment Violet 32 (Graphtol Bordeaux HF3R produced by Clariant Japan K. K.) was used. A specific surface area is 56 $m^2/g$, and an average particle diameter is 0.12 μm. The nucleus agent was mixed with the polylactic acid so that the nucleus agent of 0.5 parts by mass was included relative to 100 parts by mass of the polylactic acid. The mixture was heated and kneaded (heating temperature was 160 to 180° C.) and then pelletized to obtain a molding resin component of the Example 1.

The crystallinity of the obtained molding resin component was evaluated by a differential scanning calorimetry (DSC)

measurement in accordance with a method disclosed in Japanese Patent Application Laid-Open No. hei 10-158369. A sample of 3 to 4 mg was cut from the pellets and put in an aluminum pan. The sample was heated to 200° C. once and cooled to 0° C. at the rate of 50° C./minute. Then, while temperature is raised at the rate of 20° C./minute, a measurement was carried out. The rate of crystallization defined by a following formula was obtained from a quantity of generated heat due to the crystallization in the vicinity of 100° C. and an endothermic quantity due to a melting in the vicinity of 160° C.

The rate of crystallization (%)=(1−the quantity of the generated heat of the crystallization/the endothermic quantity of melting)×100

Further, the entire crystallization speed (crystallization time) was measured by a photographing operation by a polarizing microscope. A small quantity of the resin component was mounted on a thin glass (about 0.1 mm) to heat the resin component in a hot stage at 200° C. Further, the resin component was pressed by a thin glass to cover the resin component therewith and obtain a sample to be observed. The temperature of the sample heated to 200° C. was lowered at the rate of 90° C./minute until the temperature reached 120° C. at which the sample was held and crystallized. The state of the sample was observed by a cross nicol. The crystal of the polylactic acid has a double refraction, so that the growth of the crystal can be observed by the cross nicol. As the crystal grows, an observing visual field becomes entirely gradually bright. The brightness of the observing visual field is saturated at a prescribed level.

The observing visual field was photographed by an objective lens of 10 magnifications and a ⅓ inch black and white CCD video camera to photograph a range of about 600×450 μm (digitized with 10 bits of about 650×480 pixels) and capture the observing visual field to an image capture board of a personal computer. Then, an average of the brightness of an area of about 378×283 μm in the center of the visual field was obtained (refer it simply to as a brightness, hereinafter). Then, the brightness was plotted relative to time. The time at which the temperature reached 120° C. was set to zero and determined to be a reference. Since the double refraction of the crystal is utilized, it is important, as an observing condition, to recognize many spherulites in all parts of the observing visual field. When there is few spherulites in the observing visual field (when a magnification is high or a setting area for calculating an average brightness is small), the change of the brightness may be possibly uneven relative to the time.

Figure 2:
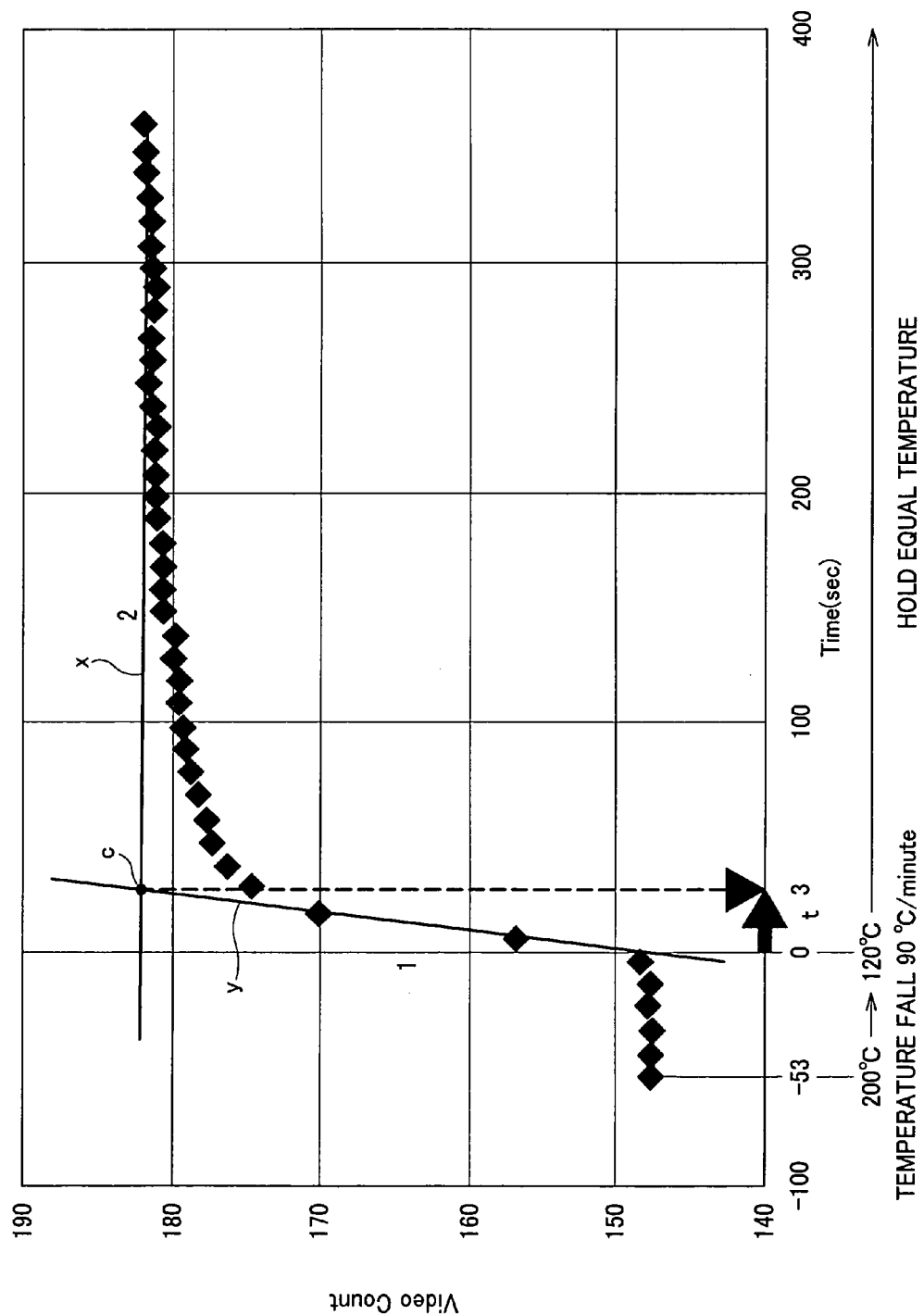
FIG. 2 is a diagram showing the relation between brightness and crystallization time.

The crystallization time was obtained as described below. That is, as shown in FIG. 2, the rise of the brightness in the vicinity of ½ as high as the saturation is shown by a straight line y and a saturation level is shown by a horizontal straight line x. Time c at an intersecting point of them is read to obtain the crystallization time t.

The rate of crystallization and the crystallization time of the resin component obtained in the Example 1 that are obtained by the above-described method are shown in Table 4.

Example 2

As the cyclic compound, C. I. Pigment Red 185 (Graphtol Carmine HF4C produced by Clariant Japan K. K.) was used. A specific surface area is 45 m²/g, and an average particle diameter is 0.18 μm.

The nucleus agent was mixed with the polylactic acid so that the nucleus agent of 0.5 parts by mass was included relative to 100 parts by mass of the polylactic acid in the same manner as that of the Example 1. The mixture was heated and kneaded (heating temperature was 160 to 180° C.) and then pelletized to obtain a molding resin component of the Example 2.

The resin component was evaluated in the same manner as that of the Example 1 and obtained results are shown in Table 4.

Example 3

As the cyclic compound, C. I. Pigment Red 208 (Graphtol Red HF2B produced by Clariant Japan K. K.) was used. A specific surface area is 65 m²/g, and an average particle diameter is 0.05 μm.

The nucleus agent was mixed with the polylactic acid so that the nucleus agent of 0.5 parts by mass was included relative to 100 parts by mass of the polylactic acid in the same manner as that of the Example 1. The mixture was heated and kneaded (heating temperature was 160 to 180° C.) and then pelletized to obtain a molding resin component of the Example 3.

The resin component was evaluated in the same manner as that of the Example 1 and obtained results are shown in Table 4.

Comparative Example 1

As the polylactic acid, the above-described H100J was used and the resin component composed only of the polylactic acid was obtained via producing processes of the same conditions as those of the above-described Examples, that is, the processes that the polylactic acid was heated, kneaded and pelletized. The resin component was evaluated as described above and obtained results were shown in the Table 4.

Comparative Example 2

Similarly, the resin component including polylactic acid of 100 parts by mass and calcium stearate (produced by Kanto Kagaku) of 0.5 parts by mass was prepared. This resin component was evaluated in the same manner as described above. Obtained results are shown in the Table 4.

As shown in the Table 4, it is said that the salt of long chain carboxylic acid has an effect as a nucleus agent to the polylactic acid. The rate of crystallization was assuredly slightly improved.

Comparative Example 3

Similarly, the resin component including polylactic acid of 100 parts by mass and bis(p-methyl benzylidene) sorbitol (Gel All MD produced by New Japan Chemical Co., Ltd.) of 0.5 parts by mass was prepared. This resin component was evaluated in the same manner as that of the above-described Example. Obtained results are shown in the Table 4.

The above-described bis(p-methyl benzylidene) sorbitol is proposed as a nucleus agent in a related art. However, in series of the evaluations at this time, the effect of the nucleus agent was very low.

Even when the amount of addition of the bis(p-methyl benzylidene) sorbitol was two parts by mass, an outstanding effect was not recognized.

Comparative Example 4

A molding resin component including the polylactic acid of 100 parts by weight and talc (LMS-200 produced by Fuji Talc Industrial Co., Ltd.) of 20 parts by weight was heated and kneaded, and then pelletized to obtain the molding resin component. This resin component was evaluated in the same manner as that of the above-described Example. Obtained results are shown in the Table 4.

TABLE 4

|  | biodegradable resin (parts by mass) | | added material (parts by mass) | |
|---|---|---|---|---|
| Example 1 | polylactic acid H100J | 100 | Graphtol Bordeaux HF3R (PV32) | 0.5 |
| Example 2 | polylactic acid H100J | 100 | Graphtol Carmine HF4C (P.R. 185) | 0.5 |
| Example 3 | polylactic acid H100J | 100 | Graphtol Red HF2B (P.R. 208) | 0.5 |
| Comparative Example 1 | polylactic acid H100J | 100 | none | — |
| Comparative Example 2 | polylactic acid H100J | 100 | calcium stearate | 0.5 |
| Comparative Example 3 | polylactic acid H100J | 100 | bis (p-methyl benzylidene) sorbitol | 0.5 |
| Comparative Example 4 | polylactic acid H100J | 100 | talc | 20 |

|  | rate of crystallization (%) | crystallization time (sec) |
|---|---|---|
| Example 1 | 100 | 37 |
| Example 2 | 79 | 54 |
| Example 3 | 49 | 57 |
| Comparative Example 1 | 7 | 237 |
| Comparative Example 2 | 12 | 207 |
| Comparative Example 3 | 7 | 212 |
| Comparative Example 4 | 84 | 52 |

Now, specific examples of a resin component including a cyclic compound having a condensed azo structure as a nucleus agent and a polyester capable of having a crystal structure will be described below.

Example 4

In this Example 4, as a material forming a molded body, H100J of polylactic acid (produced by Mitsui Chemicals, Inc.) was used as the polyester capable of having the crystal structure. The polylactic acid had a molecular weight of 200000. As the condensed azo compound serving as the nucleus agent, C. I. Pigment Red 144 (CROMOPHTAL Red BT produced by Ciba Specialty Chemicals Corporation) was used.

Initially, the polylactic acid pellets were dried by hot air at 80° C. for 12 hours. Then, the polylactic acid pellets and the condensed azo compound were weighed so that the nucleus agent of 0.5 parts by weight was included relative to 100 parts by weight of the polylactic acid and mixed by a mixer. Further, the mixture was kneaded by using a twin-screw extruder (ZE-40A produced by Berstorff). The mixed materials were charged from a charging port, kneaded and then deaerated under vacuum from a vent port. Conditions during a kneading operation are described below.

Diameter of screw: 40 mm
L/D: 35.5
Total length: 1340 mm
Strand cooling: water cooling
Temperature: set flat to 180° C. over the entire length, measured value ranges from 178° C. to 185° C.
Rotating speed of screw: 150 rpm
Quantity of supply of main: 15 or 25 kg/h Then, the resin component after the heating and kneading operations was cut and pelletized and the pellets were dried by hot air to obtain a molding resin component of the Example 4.

The crystallinity of the obtained molding resin component was evaluated by two methods as described below. As one of the methods, the crystallinity of the resin component was evaluated by a differential scanning calorimetry (DSC) measurement in accordance with a method disclosed in Japanese Patent Application Laid-Open No. hei 10-158369. A sample of 3 to 4 mg was cut from the pellets and put in an aluminum pan. The sample was heated to 200° C. once and cooled to 0° C. at the rate of 100° C./minute. Then, while temperature is raised at the rate of 20° C./minute, a measurement was carried out. The rate of crystallization defined by a following formula was obtained from a quantity of generated heat due to the crystallization in the vicinity of 100° C. and an endothermic quantity due to a melting in the vicinity of 160° C.

The rate of crystallization (%)=(1−the quantity of the generated heat of the crystallization/the endothermic quantity of melting)×100

As the other of the methods, crystallization temperature when the temperature falls at the rate of 20° C./minute was measured. That is, the sample was heated to 200° C. once and cooled to 0° C. at the rate of 20° C./minute and peak temperature during the generation of heat due to the crystallization in the vicinity of 120° C. was obtained. Obtained results are shown in Table 5.

Example 5

The nucleus agent was mixed with the polylactic acid so that the nucleus agent of 0.5 parts by weight was included relative to 100 parts by weight of the polylactic acid, the mixture was heated and kneaded, and then, pelletized to obtain a molding resin component of the Example 5 in the same manner as that of the Example 4 except that C. I. Pigment Red 166 (CROMOPHTAL Scarlet RT produced by Ciba Specialty Chemicals Corporation) was used as the condensed azo compound. The resin component was evaluated in the same manner as that of the Example 4 and obtained results are shown in Table 5.

Example 6

The resin component was prepared and evaluated in the same manner as that of the Example 4 except that C. I. Pigment Red 214 (CROMOPHTAL Red BN produced by Ciba Specialty Chemicals Corporation) was used as the condensed azo compound. Obtained results are shown in Table 5.

Example 7

The resin component was prepared and evaluated in the same manner as that of the Example 4 except that C. I. Pigment Red 242 (PV Fast Scarlet 4RF produced by Clariant Japan K. K.) was used as the condensed azo compound. Obtained results are shown in Table 5.

Example 8

The resin component was prepared and evaluated in the same manner as that of the Example 4 except that C. I. Pigment Brown 23 (CROMOPHTAL Brown 5R produced by Ciba Specialty Chemicals Corporation) was used as the condensed azo compound. Obtained results are shown in Table 5.

Example 9

The resin component was prepared and evaluated in the same manner as that of the Example 4 except that C. I. Pigment Red 262 (Graphtol Red 2BN produced by Clariant Japan K. K.) was used as the condensed azo compound. Obtained results are shown in Table 5.

Comparative Example 5

As the polylactic acid, the above-described H100J was used and the resin component composed only of the polylactic acid was obtained via producing processes of the same conditions as those of the above-described Examples, that is, the processes that the polylactic acid was heated, kneaded and pelletized. The resin component was evaluated as described above and obtained results were shown in the Table 5.

Comparative Example 6

The resin component was prepared in the same manner as that of the Example 4 except that calcium stearate (produced by Kanto Kagaku) of 0.5 parts by weight was used in place of the condensed azo compound. This resin component was evaluated in the same manner as that of the Example. Obtained results are shown in the Table 5.

Comparative Example 7

The resin component was prepared in the same manner as that of the Example 4 except that talc (LMS/200 produced by Fuji Talc Industrial Co., Ltd.) of 25 parts by weight was used in place of the condensed azo compound. This resin component was evaluated in the same manner as that of the Example. Obtained results are shown in the Table 5.

TABLE 5

| | polyester (parts by mass) | | added material (parts by mass) | |
|---|---|---|---|---|
| Example 4 | polylactic acid H100J | 100 | CROMOPHTAL Red BT (P.R. 144) | 0.5 |
| Example 5 | polylactic acid H100J | 100 | CROMOPHTAL Scarlet RT (P.R. 166) | 0.5 |
| Example 6 | polylactic acid H100J | 100 | CROMOPHTAL Red BN (P.R. 214) | 0.5 |
| Example 7 | polylactic acid H100J | 100 | PV Fast Scarlet 4RF (P. R. 242) | 0.5 |
| Example 8 | polylactic acid H100J | 100 | CROMOPHTAL Brown 5R (P.B. 23) | 0.5 |
| Example 9 | polylactic acid H100J | 100 | Graphtol Red 2BN (P.R. 262) | 0.5 |
| Comparative Example 5 | polylactic acid H100J | 100 | none | — |
| Comparative Example 6 | polylactic acid H100J | 100 | calcium stearate | 0.5 |
| Comparative Example 7 | polylactic acid H100J | 100 | talc | 25 |

TABLE 5-continued

| | rate of crystallization (%) | crystallization temperature (° C.) |
|---|---|---|
| Example 4 | 91 | 131.7 |
| Example 5 | 84 | 127.0 |
| Example 6 | 86 | 131.0 |
| Example 7 | 84 | 133.7 |
| Example 8 | 20 | 121.7 |
| Example 9 | 87 | 129.7 |
| Comparative Example 5 | 0 | not observed |
| Comparative Example 6 | 2 | 93.6 |
| Comparative Example 7 | 49 | 109.6 |

As apparent from the Table 5, in the Example 4 to the Example 9 in which the above-described condensed azo compounds or the C. I. Pigment Red 262 were included in the resin component, the rate of crystallization was improved and the crystallization temperature was very high in all of them.

On the contrary, in the Comparative Example 5 in which the compound showing the action of the nucleus agent was not included, the condition of the DSC measurement, that is, a heat generation peak was not observed when the temperature falls at the rate of 20° C./minute from 200° C. under a molten state. It is recognized that the polylactic acid is not crystallized and hardened under a state that the polylactic acid remains amorphous. Precisely, it is anticipated that the polylactic acid is only slightly crystallized. However, in this measurement, the crystallization was not detected. Further, it is said that the salt of a long chain carboxylic acid has an effect of a nucleus agent to the polylactic acid. In the Comparative Example 6, the rate of crystallization was assuredly only slightly improved. However, the rate of crystallization was low as small as 2%. The crystallization temperature was also low. Further, in the Comparative Example 7 including talc, the rate of crystallization was slightly improved and the crystallization temperature was higher than that of the Comparative Example 5 or the Comparative Example 6, however, they did not reach the levels of the above-described Examples.

Now, a method for producing a molded body according to the present invention will be described below.

In a method for molding a molded body according to the present invention, the molded body is molded by using the above-described resin component according to the present invention.

Namely, the molded body according to the present invention is formed by heating any of the above-described resin components and filling a metal mold device for molding with the resin component.

In the method for producing the molded body according to the present invention, a heating process may employ any of methods in which the above-described resin component can be heated and molten. As heating means used in the heating process, for instance, a heater or the like may be employed.

Heating temperature in the heating process is ordinarily temperature within a range from about +10 to +50° C. of the melting point of the resin component, and is preferably the temperature higher by about +15 to +30° C. than the melting point of the resin component. The melting point is a value measured by a differential scanning calorimeter (DSC). For instance, the resin component of 3 to 4 mg is cut, and put in an aluminum pan. The cut resin component is used as a sample. The sample is heated to 200° C. once and cooled to 0° C. at the rate of 50° C./minute. Then, while the temperature raised at the rate of 20° C./minute, a DSC measurement is carried out so that the temperature is obtained as the temperature of an endothermic peak, for instance, in the vicinity of 160° C.

A filling and holding process of the resin component may employ any of methods in which a metal mold is filled with the resin component molten via the heating process and the resin component is held. As the metal mold used for molding the resin component, any of the metal molds whose temperature can be retained to a temperature within a temperature range from about −50 to +30° C. of the crystallization temperature of the resin component may be employed. The type of the metal mold is not especially limited to a specific kind. Heat insulating means of the metal mold may be well-known means. As the heat insulating means, for instance, means using a heater and a thermostat may be exemplified. In the present invention, the heat insulating temperature of the metal mold is ordinarily the temperature within a temperature range from about −50 to +30° C. of the crystallization temperature of the resin component from the viewpoint of the crystallization of the resin component and the prevention of a thermal deformation of the molded body. Preferably, the heat insulating temperature of the metal mold is about 90 to 140° C. The crystallization temperature is a value measured by a DSC measurement. For instance, the resin component of 3 to 4 mg is cut, and put in an aluminum pan. The cut resin component is used as a sample. The sample is heated to 200° C. once. While the sample is cooled to 0° C. at the rate of 20° C./minute, a DSC measurement is carried out so that the crystallization temperature is obtained as the temperature of a heat generation peak, for instance, in the vicinity of 120° C.

When the resin component is composed of a plurality of kinds of polyesters, a plurality of endothermic peaks and a plurality of heat generation peaks that are originated therefrom may be measured in the above-described DSC measurement. In this case, the melting point of the resin component is determined to be the temperature of the endothermic peak originated from the main polyester among the polyesters that has the highest content. The crystallization temperature is also determined to be the temperature of the heat generation peak that is originated from the main polyester.

The temperature of the molten resin component with which the metal mold is filled is higher than the heat insulating temperature of the metal mold in an initial state in which the metal mold is filled with the resin component. However, with the elapse of time, the temperature of the resin component comes near to the heat insulating temperature. As filling means, any of means by which the metal mold can be filled with the molten resin component may be employed. Well-known means may be employed. For instance, means for injecting the molten resin component into the metal mold under pressure may be exemplified. As cooling means, any of means by which the molten resin component can be cooled may be employed and well-known means may be used. Any of cooling means that can cool the molten resin component may be employed. Cooling time is not especially limited to a specific time. The molten resin component may be rapidly cooled or gradually cooled. The cooling means may be well-known means. As such means, for instance, radiating means, or means using water, ice, ice water, dry ice or liquid nitrogen may be exemplified. In the present invention, filling and holding time is more preferably about 10 seconds to 4 minutes and most preferably about 20 seconds to 1 minute from the viewpoint of the crystallization and the productivity of the resin component. In the present invention, as soon as the crystallization of the resin component is completely saturated, the molded body is taken out from the metal mold.

According to the present invention, after the filling and holding process of the molten resin component in the metal mold, when the molded body is taken out from the metal mold, the temperature of the molded body is preferably low. As means for lowering the temperature of the molded body, for instance, means for blowing cold air to the molded body when the metal mold is opened may be exemplified. The temperature of the molded body is lowered as described above, so that a risk of the deformation of the molded body may be improved.

Further, to the method for producing the molded body according to the present invention, well-known methods such as a casting method, a compression method, a transfer method, an injection method, an extrusion method, an inflation method, a calendering method, a blowing, method, a vacuum method, a lamination method, a spray up method, a foaming method, a matched die method, an SMC method, etc. may be applied. In the present invention, when the producing method of the present invention is applied to such molding methods, the molded body of the polyester resin component is preferably produced by using a well-known molding machine such as an injection molding machine. The producing method according to the present invention preferably employs an injection molding method.

Now, a preferable producing method of the present invention is specifically described below.

The above-described resin component according to the present invention is heated and molten at the temperature higher by about +15 to +30° C. than the melting point of the resin component by using the well-known injection molding machine. The molten resin component is injected into the metal mold whose temperature is retained to the temperature within the temperature range from −50 to +30° C. of the crystallization temperature of the resin component. After the injection of the resin component, pressure is continuously applied to the molten material in the metal mold as desired to compensate for what is called a "sink mark". Then, the pressure is released to leave the molten resin component. This time for leaving the resin component is called a cooling time. It is to be understood that while the resin component is held, heat is gradually absorbed by the metal mold from the resin and the temperature of the resin in the metal mold gradually falls. Accordingly, a holding time may be substantially considered to be included in the cooling time. Here, as generally said, the leaving time after a holding pressure is released is referred to as the cooling time. Injection pressure speed, injection pressure, an injection time, the holding pressure, the holding time or the like may be suitably set depending on the kinds of the employed resin component and the forms of the metal mold. The cooling time is ordinarily about 1 minute or less, and preferably about 20 seconds to 1 minute. The cooling time may be set to a time necessary for substantially completely saturating the crystallization of the resin molded in the form of the metal mold.

In the producing method according to the present invention, the resin is crystallized upon molding the resin. However, the present invention is not limited to this example.

Before the producing method according to the present invention is described, problems of the related art are described below. In the related art, the heat insulating temperature of a metal mold is set to temperature not higher than Tg of a resin. When the resin is injected into the metal mold, the heat of the injected resin is rapidly absorbed by the metal mold so that the resin hardly flows in the metal mold. Accordingly, flow marks have been formed in a molded body or welds have been extremely readily marked. Further, accordingly, when the resin is molded in a metal mold having a complicated form, the number of gates has needed to be increased to assuredly fill the metal mold with the resin. Thus, runners have been generated by the number of the gates and the resin has been wasted the more.

On the other hand, the temperature of the metal mold in the method of the present invention is higher than the temperature of the metal mold of the related art. Accordingly, the absorbed heat of the resin injected into the metal mold is lower than that of the related art and the flowability of the resin in the metal mold is better than that of the related art. Therefore, the problems of the flow marks or the welds hardly arise. Further, the number of the gates can be reduced more than that of the related art. A wasted resin due to the runners can be more reduced.

The molded body of the polyester resin component produced by using the producing method according to the present invention may be employed for various kinds of uses. The uses of the molded body include, for instance, a power generator, an electric motor, a transformer, a current transformer, a voltage adjuster, a rectifier, an inverter, a relay, a contact for electric power, a switch, a circuit breaker, a knife switch, a multipolar rod, an electric parts cabinet, a light socket, various kinds of terminal boards, electric device parts such as a plug or a power module, electronic parts such as a sensor, an LED lamp, a connector, a resistor, a relay case, a molded body switch, a coil bobbin, a condenser, a variable condenser case, an optical pick-up, an oscillator, a transformer, a printed circuit board, a tuner, a speaker, a microphone, a headphone, a storage device such as a floppy (registered trademark) disc or an MO disc, a molded body motor, a magnetic head base, a semiconductor, a liquid crystal, an FDD carriage, an FDD chassis, a printer such as an ink jet printer or a thermal transfer printer, a motor brush holder, a parabolic antenna, parts related to a personal computer, VTR parts, television parts, casings or structural materials of electric or electronic devices such as a CD player, a portable music reproducing device, a radio, a television, a video or a personal computer, parts of domestic and office electric products such as an iron, a hair drier, rice boiler parts, microwave oven parts, an acoustic device or audio device parts such as audio laser disc (registered trademark) or a molded body disc, lighting parts, freezer parts, air conditioner parts, typewriter parts or word processor parts, parts related to an office computer, parts related to a telephone, parts related to a facsimile, parts related to a copying machine, parts related to a machine such as a cleaning jig, motor parts, a writer or a typewriter, optical devices such as a microscope, a binocular, a camera, a clock, parts related to a precision instrument, parts related to a motor vehicle and a vehicle such as an alternator terminal, an alternator connector, an IC regulator, a potentiometer base for a light dayer, various kinds of valves such as an exhaust valve, various kinds of pipes related to fuel, and an exhaust system and an air intake system, an air intake nozzle snorkel, an intake manifold, a fuel pump, an engine cooling water joint, a carburetor main body, a carburetor spacer, an exhaust gas sensor, a cooling water sensor, an oil temperature sensor, a brake pad wear sensor, a throttle position sensor, a crank shaft position sensor, an air flow meter, a brake pad abrasion sensor, a thermostat base for an air conditioner, an air flow control valve for heating, a brush holder for a radiator motor, a water pump impeller, a turbine vane, parts related to a wiper motor, a distributor, a starter switch, a starter relay, a wire harness for a transmission, a window washer nozzle, an air conditioner panel switch board, a coil for a solenoid valve related to fuel, a connector for fuse, a horn terminal, an insulating plate of electrical parts, a step motor rotor, a lamp socket, a lamp reflector, a lamp housing, a brake piston, a solenoid bobbin, an engine oil filter, an ignition device case, a package material, etc.

The molded body is preferably used as the casing members of the electric or electronic devices such as the televisions or the personal computers a large quantity of which is discharged among these molded bodies. After the casing members of the televisions or the personal computers may be biodegraded and disposed after they are used. Thus, an excessive energy is not advantageously consumed for disposing the waste.

Now, specific examples of a producing method of a molded body using the above-described resin component according to the present invention will be described below.

Example 10

Resin Component

Initially, the resin component used here is described below. As the polyester capable of having the crystal structure, H100J (produced by Mitsui Chemicals, Inc.) as the polylactic acid was crushed and the product passing through a sieve of 32 Mesh was used.

As the crystallizing nucleus agent, C. I. Pigment Yellow 110 (CROMOPHTAL Yellow 2RLP produced by Chiba Fine Chemical Co., Ltd.) was employed. A specific area is 49 m²/g.

The polylactic acid of 99.5 mass % and the crystallizing nucleus agent of 0.5 mass % were mixed relative to a mass obtained by adding the mass of the crystallizing nucleus agent to the mass of the polylactic acid. The mixture of the total weight of 12 kg was used and heated and kneaded at temperature of 180° C. by a twin-screw extruder to obtain a pellet.

The melting point of the resin component was 166° C. and the crystallization temperature was 136° C.

<Molding>

Then, the resin component was molded under below-described conditions by using an injection molding device (F40 produced by Klockner). The temperature of a cylinder was set to 200° C. in all parts of a nozzle, a front part, a central part and a rear part. As a metal mold, a metal mold for a flat plate of 50×80×1.2 mm was used. A power of a heater was adjusted so that the temperature of the surface of the metal mold was 100 to 103° C. by an actual measurement of a contact temperature gauge. The rotating speed of a screw was set to 70 rpm and a back pressure was set to 0.5 MPa. A quantity of measurement was 4 to 5 sec. An injection speed of this device was set to 40% relative to 200% as the maximum setting value of the injection speed of this device. An injection pressure was set to 45.2 MPa (set to 16% relative to the maximum pressure of 100% of this device). An injection time was set to 3 sec. Holding pressure was set to 35 MPa (set to 13% relative to the maximum pressure of 100% of this device). A holding time was set to 2 sec. A cooling time after the pressure was held (a leaving time) was set to 60 sec. A cycle time was 71 sec.

When the resin was molded under the above-described conditions, a visually good flat plate could be obtained.

<Measurement>

A sample piece for viscoelasticity was cut from a central part of the plate by a machining work. A modulus of viscoelasticity was measured and a mechanical strength was examined.

A measuring method is described below.

Test piece: length of 50 mm×width of 7 mm×thickness of 1.2 mm

Measuring device: viscoelasticity analyzer RSA-II (produced by Rheometric Scientific FE, Ltd.)

Measuring geometry: Dual Cantilever Bending

Frequency: 6.28 (rad/s)

Measurement start temperature: 30(° C.)

Measurement final temperature: 150(° C.)

Temperature rise speed: 5(° C./min)

Distortion: 0.05(%)

A tension elasticity measurement and a bending elasticity measurement are applied to the measuring method. The viscoelasticity in the vicinity of 80° C. is observed so that whether or not the crystallization is accelerated can be understood.

Figure 3:
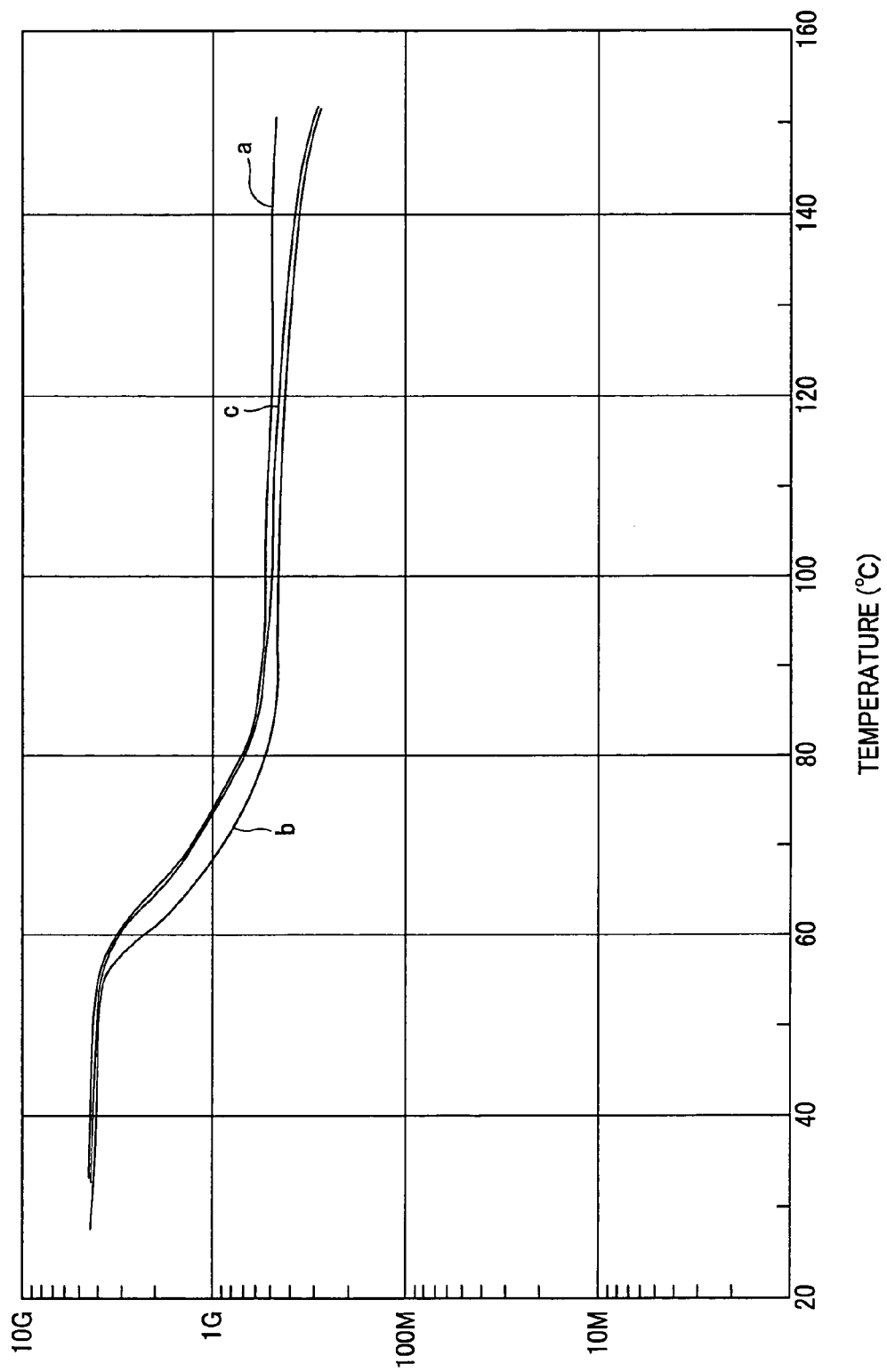
FIG. 3 is a diagram showing the relation between a modulus of viscoelasticity and temperature of a molded body obtained by a producing method according to the present invention.

In accordance with the measured results, as shown by a in FIG. 3, the modulus of viscoelasticity was gently lowered at the temperature exceeding 60° C. and did not drop. That is, it was recognized that the crystallization of the polylactic acid of the molded body was completely saturated.

Example 11

Now, an Example 11 of the method for producing the molded body according to the present invention will be described.

In the Example 11, the resin component was molded in the same manner as that of the above-described Example 10 except that the temperature of the metal mold was set to 90° C. When the obtained molded body was visually observed after the resin component was molded, a flat place having no deformation was recognized. The modulus of viscoelasticity of this flat plate had only a slight fall at the temperature exceeding 60° C. as shown by b in FIG. 3. Accordingly, the resin component can be decided to be substantially completely saturated.

Example 12

Now, an Example 12 of the method for producing the molded body according to the present invention will be described.

In the Example 12, the resin component was molded in the same manner as that of the above-described Example 11 except that the holding time was set to 5 minutes. The modulus of viscoelasticity of an obtained molded body had no drop at the temperature exceeding 60° C. as shown by c in FIG. 3. Accordingly, the resin component can be decided to be adequately completely saturated.

Comparative Example 8

Now, a Comparative Example 8 will be described.

In the Comparative Example 8, the resin component was molded in the same manner as that of the above-described Example 10 except that the temperature of the metal mold was set to 80° C. A warp of several mm was visually observed on the plate of the obtained molded body after the resin component was molded.

INDUSTRIAL APPLICABILITY

As described above, since the crystallinity of the resin component according to the present invention is high, the resin component is excellent in its rigidity and moldability. Further, the resin component is excellent in its transparency, so that the resin component can be applied to a wide range. Still further, after the disposal of the resin component, the resin component is decomposed in a natural environment. Thus, the present invention is preferable in view of security of a global atmosphere.

Further, in the producing method for the molded body according to the present invention, since the resin component is crystallized in the metal mold when the resin component including a polyester capable having at least the crystal structure is molded, the productivity of the obtained molded body can be more improved than a usual molded body that is subjected to a post-thermal treatment. The molded body of high quality substantially having no deformation nor distortion can be obtained.

The invention claimed is:

1. A resin component including a cyclic compound comprising:
   a polyester having at least a partially crystallized structure, and
   a nucleus agent that is a condensed azo structure, the nucleus agent effective to accelerate the crystallization of the polyester.

2. The resin component according to claim 1, wherein the cyclic compound including the nucleus agent is a condensed azo compound expressed by a below-described formula A

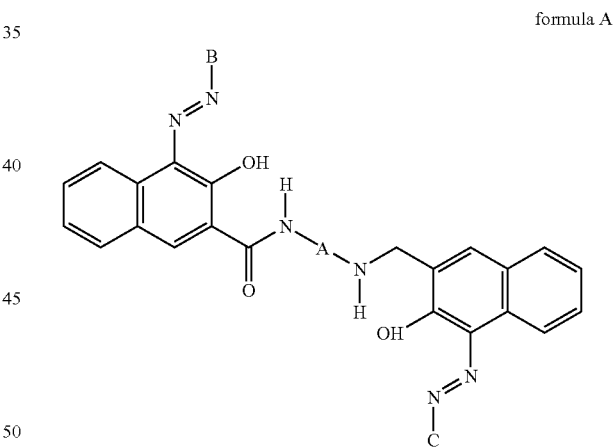

formula A where A is a bivalent connecting chain, and
B and C are each a monovalent substitutional group having aromatic rings and B and C may be the same or different.

3. The resin component according to claim 2, wherein the bivalent connecting chain A is a bivalent hydrocarbon group having an aromatic ring.

4. The resin component according to claim 3, wherein the bivalent connecting chain A is a substituted or non-substituted phenylene group.

5. The resin component according to claim 2, wherein the monovalent substitutional groups B and C are substituted or non-substituted phenyl groups.

6. The resin component according to claim 2, wherein the condensed azo compound expressed by the above-described formula A is at least one of the group consisting of C. I.

Pigment Red 144, C. I. Pigment Red 166, C. I. Pigment Red 214, C. I. Pigment Red 242, and C. I. pigment Brown 23.

7. The resin component according to claim 1, wherein the cyclic compound including the nucleus agent that is the condensed azo structure is C. I. Pigment Red 262.

8. The resin component according to claim 1, wherein the cyclic compound including the nucleus agent that is the condensed azo structure has a particle shape whose particle diameter ranges from exceeding 0 and not larger than 10 µm.

9. The resin component according to claim 1, wherein the polyester having at least a partially crystallized structure is a biodegradable polyester.

10. The resin component according to claim 9, wherein the biodegradable polyester is polylactic acid.

11. The resin component according to claim 1, wherein the ratio of the cyclic compound including the nucleus agent that is the condensed azo structure is within a range from 0.001 parts by weight to 10 parts by weight relative to the polyester of 100 parts by weight that is capable of having the crystal structure.

12. The resin component according to claim 11, wherein the ratio of the cyclic compound including the nucleus agent that is the condensed azo structure is within a range from 0.01 parts by weight to 1 parts by weight relative to the polyester of 100 parts by weight that is capable of having the crystal structure.

13. The resin component according to claim 1, wherein an inorganic filler is further included in the resin component.

14. The resin component according to claim 13, wherein the inorganic filler is talc.

15. The resin component according to claim 14, wherein the ratio of the inorganic filler is within a range from 1 parts by weight to 50 parts by weight relative to the polyester having at least a partially crystallized structure of 100 parts by weight.

16. The resin component according to claim 1, wherein a hydrolysis inhibitor is further included.

17. The resin component according to claim 16, wherein the hydrolysis inhibitor includes a compound having a carbodiimide group.

18. The resin component according to claim 1, wherein crystallization temperature is within a range from the melting point of the resin component −55° C. to the melting point of the resin component.

* * * * *